US010303102B2

(12) United States Patent
Etou

(10) Patent No.: US 10,303,102 B2
(45) Date of Patent: May 28, 2019

(54) IMAGE FORMING APPARATUS AND IMAGE FORMING SYSTEM

(71) Applicant: KONICA MINOLTA, INC., Chiyoda-ku, Tokyo (JP)

(72) Inventor: Kouichi Etou, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/839,953

(22) Filed: Dec. 13, 2017

(65) Prior Publication Data

US 2018/0173148 A1 Jun. 21, 2018

(30) Foreign Application Priority Data

Dec. 15, 2016 (JP) ................................ 2016-243675

(51) Int. Cl.
*G06F 3/12* (2006.01)
*G03G 15/00* (2006.01)
*G03G 21/20* (2006.01)

(52) U.S. Cl.
CPC ......... *G03G 15/553* (2013.01); *G03G 21/203* (2013.01)

(58) Field of Classification Search
None
See application file for complete search history.

(56) References Cited

U.S. PATENT DOCUMENTS

| | | | | |
|---|---|---|---|---|
| 6,546,212 B1 * | 4/2003 | Ogata | G03G 15/553 399/12 |
| 7,016,618 B2 * | 3/2006 | Jeong | G03G 15/553 399/24 |
| 8,582,988 B2 * | 11/2013 | Rapkin | G03G 15/5079 399/24 |
| 8,798,487 B2 * | 8/2014 | Asano | G03G 15/5037 399/26 |
| 9,158,242 B2 * | 10/2015 | Saito | G03G 15/18 |
| 9,268,282 B2 * | 2/2016 | Saito | G03G 15/553 |
| 9,377,741 B2 * | 6/2016 | Kikuchi | G03G 15/556 |
| 9,772,591 B2 * | 9/2017 | Taniguchi | G03G 15/502 |
| 2007/0081828 A1 * | 4/2007 | Radulski | G03G 15/6529 399/27 |
| 2013/0136466 A1 * | 5/2013 | Saito | G03G 15/18 399/31 |

(Continued)

FOREIGN PATENT DOCUMENTS

| | | |
|---|---|---|
| JP | 2003-195700 A | 7/2003 |
| JP | 2004-184601 A | 7/2004 |
| JP | 2007-316217 A | 12/2007 |

*Primary Examiner* — Dung D Tran
(74) *Attorney, Agent, or Firm* — Buchanan Ingersoll & Rooney PC

(57) ABSTRACT

An image forming apparatus including an image forming unit and a controller configured to control an operation of the image forming unit is provided. The image forming unit includes a conductive member to which a bias voltage is supplied in image formation. The controller is configured to calculate an operating ratio indicating a percentage of a time period during which the conductive member is used, and calculate a value indicating a consumption degree of the conductive member based on the calculated operating ratio and a magnitude of an electrical resistance of the conductive member.

17 Claims, 22 Drawing Sheets

(56) References Cited

U.S. PATENT DOCUMENTS

| | | | | |
|---|---|---|---|---|
| 2015/0277330 | A1* | 10/2015 | Hagiwara | G03G 15/6529 399/397 |
| 2016/0378034 | A1* | 12/2016 | Taniguchi | G03G 15/502 399/81 |
| 2018/0120748 | A1* | 5/2018 | Shibuya | G03G 15/553 |
| 2018/0210376 | A1* | 7/2018 | Hirai | G03G 15/1665 |

* cited by examiner

FIG.5

FIRST COEFFICIENT TABLE

| | | OPERATING RATIO [%] | | | | | | | | |
|---|---|---|---|---|---|---|---|---|---|---|
| | | ≤ 20 | ≤ 30 | ≤ 40 | ≤ 50 | ≤ 60 | ≤ 70 | ≤ 80 | ≤ 90 | ≤ 100 |
| ABSOLUTE HUMIDITY [g/cm$^3$] | A ≤ 1 | 0 | 0 | −0.005 | −0.01 | −0.02 | −0.03 | −0.04 | −0.03 | −0.02 |
| | 1 < A ≤ 2 | 0 | 0 | 0 | −0.005 | −0.01 | −0.02 | −0.03 | −0.02 | −0.01 |
| | 2 < A ≤ 3 | 0 | 0 | 0 | 0 | −0.005 | −0.01 | −0.02 | −0.01 | 0 |
| | 3 < A ≤ 4 | 0 | 0 | 0 | 0 | 0 | −0.005 | −0.01 | 0 | 0.005 |
| | 4 < A ≤ 5 | 0 | 0 | 0 | 0 | 0 | 0 | 0 | 0.005 | 0.01 |
| | 5 < A ≤ 6.5 | 0 | 0 | 0 | 0 | 0 | 0 | 0.005 | 0.01 | 0.015 |
| | 6.5 < A ≤ 8 | 0 | 0 | 0 | 0 | 0 | 0.005 | 0.01 | 0.015 | 0.02 |
| | 8 < A ≤ 10 | 0 | 0 | 0 | 0 | 0.005 | 0.01 | 0.015 | 0.02 | 0.025 |
| | 10 < A ≤ 12 | 0 | 0 | 0 | 0 | 0.005 | 0.01 | 0.015 | 0.02 | 0.025 |
| | 12 < A ≤ 14 | 0 | 0 | 0 | 0.005 | 0.01 | 0.015 | 0.02 | 0.025 | 0.03 |
| | 14 < A ≤ 16 | 0 | 0 | 0 | 0.005 | 0.01 | 0.015 | 0.02 | 0.025 | 0.03 |
| | 16 < A ≤ 18 | 0 | 0 | 0.005 | 0.01 | 0.015 | 0.02 | 0.025 | 0.03 | 0.035 |
| | 18 < A ≤ 21 | 0 | 0 | 0.005 | 0.01 | 0.015 | 0.02 | 0.025 | 0.03 | 0.035 |
| | 21 < A ≤ 24 | 0 | 0.005 | 0.01 | 0.015 | 0.02 | 0.025 | 0.03 | 0.035 | 0.04 |
| | 24 < A ≤ 28 | 0 | 0.005 | 0.01 | 0.015 | 0.02 | 0.025 | 0.03 | 0.035 | 0.04 |
| | 28 < A | 0 | 0.005 | 0.01 | 0.015 | 0.02 | 0.025 | 0.03 | 0.035 | 0.04 |

FIG.6

AUXILIARY TABLE

| OPERATING RATIO | | PERCENTAGE OF TIME PERIOD IN IMAGE FORMING OPERATION FROM POWER-ON/RETURN FROM SLEEP UNTIL LATEST ATVC | | | | | | | | | |
|---|---|---|---|---|---|---|---|---|---|---|---|
| | | ≤ 10 | ≤ 20 | ≤ 30 | ≤ 40 | ≤ 50 | ≤ 60 | ≤ 70 | ≤ 80 | ≤ 90 | ≤ 100 |
| TIME PERIOD FROM POWER-ON/RETURN FROM SLEEP UNTIL LATEST ATVC | LESS THAN 0.5 HOURS | 0 | 0 | 0 | 0 | 0 | 10 | 12.5 | 15 | 18 | 25 |
| | TO 0.5 HOURS | 0 | 0 | 0 | 0 | 10 | 15 | 20 | 25 | 35 | 50 |
| | TO 1.0 HOUR | 0 | 0 | 0 | 10 | 20 | 30 | 40 | 50 | 60 | 75 |
| | TO 1.5 HOURS | 0 | 0 | 10 | 20 | 30 | 40 | 50 | 65 | 80 | 100 |
| | TO 2.0 HOURS | 0 | 10 | 20 | 30 | 40 | 50 | 60 | 70 | 85 | 100 |
| | MORE THAN 2.0 HOURS | 10 | 20 | 30 | 40 | 50 | 60 | 70 | 80 | 90 | 100 |

FIG.7

SECOND COEFFICIENT TABLE

| | | TEMPERATURE [°C] | | | | | | | | | | | | | | |
|---|---|---|---|---|---|---|---|---|---|---|---|---|---|---|---|---|
| | | ≤ 10 | ≤ 11 | ≤ 12 | ≤ 13 | ≤ 14 | ≤ 15 | ≤ 16 | ≤ 18 | ≤ 20 | ≤ 22 | ≤ 24 | ≤ 26 | ≤ 28 | ≤ 30 | 30 < |
| RELATIVE HUMIDITY [%] | > 85 | 1.87 | 1.71 | 1.58 | 1.47 | 1.37 | 1.29 | 1.21 | 1.09 | 0.99 | 0.90 | 0.83 | 0.77 | 0.72 | 0.68 | 0.68 |
| | 85 ≥ | 1.93 | 1.77 | 1.63 | 1.51 | 1.41 | 1.33 | 1.25 | 1.12 | 1.02 | 0.93 | 0.86 | 0.80 | 0.75 | 0.70 | 0.70 |
| | 80 ≥ | 1.99 | 1.83 | 1.68 | 1.57 | 1.46 | 1.37 | 1.29 | 1.16 | 1.05 | 0.96 | 0.89 | 0.83 | 0.77 | 0.72 | 0.72 |
| | 75 ≥ | 2.06 | 1.89 | 1.75 | 1.62 | 1.51 | 1.42 | 1.34 | 1.20 | 1.09 | 1.00 | 0.92 | 0.86 | 0.80 | 0.75 | 0.75 |
| | 70 ≥ | 2.14 | 1.96 | 1.81 | 1.68 | 1.57 | 1.48 | 1.39 | 1.25 | 1.13 | 1.04 | 0.96 | 0.89 | 0.83 | 0.78 | 0.78 |
| | 65 ≥ | 2.23 | 2.05 | 1.89 | 1.75 | 1.64 | 1.54 | 1.45 | 1.30 | 1.18 | 1.08 | 1.00 | 0.93 | 0.87 | 0.81 | 0.81 |
| | 60 ≥ | 2.33 | 2.14 | 1.97 | 1.83 | 1.71 | 1.61 | 1.51 | 1.36 | 1.23 | 1.13 | 1.04 | 0.97 | 0.90 | 0.85 | 0.85 |
| | 55 ≥ | 2.45 | 2.24 | 2.07 | 1.92 | 1.80 | 1.68 | 1.59 | 1.42 | 1.29 | 1.18 | 1.09 | 1.02 | 0.95 | 0.89 | 0.89 |
| | 50 ≥ | 2.58 | 2.36 | 2.18 | 2.03 | 1.89 | 1.77 | 1.67 | 1.50 | 1.36 | 1.25 | 1.15 | 1.07 | 1.00 | 0.94 | 0.94 |
| | 45 ≥ | 2.73 | 2.50 | 2.31 | 2.15 | 2.00 | 1.88 | 1.77 | 1.59 | 1.44 | 1.32 | 1.22 | 1.13 | 1.06 | 0.99 | 0.99 |
| | 40 ≥ | 2.91 | 2.67 | 2.46 | 2.29 | 2.14 | 2.01 | 1.89 | 1.70 | 1.54 | 1.41 | 1.30 | 1.21 | 1.13 | 1.06 | 1.06 |
| | 35 ≥ | 3.14 | 2.87 | 2.65 | 2.46 | 2.30 | 2.16 | 2.03 | 1.82 | 1.66 | 1.52 | 1.40 | 1.30 | 1.21 | 1.14 | 1.14 |
| | 30 ≥ | 3.41 | 3.12 | 2.88 | 2.68 | 2.50 | 2.35 | 2.21 | 1.99 | 1.80 | 1.65 | 1.52 | 1.41 | 1.32 | 1.24 | 1.24 |
| | 25 ≥ | 3.77 | 3.45 | 3.19 | 2.96 | 2.77 | 2.60 | 2.45 | 2.19 | 1.99 | 1.82 | 1.68 | 1.56 | 1.46 | 1.37 | 1.37 |
| | 20 ≥ | 4.26 | 3.90 | 3.60 | 3.35 | 3.13 | 2.93 | 2.76 | 2.48 | 2.25 | 2.06 | 1.90 | 1.77 | 1.65 | 1.55 | 1.55 |
| | 15 ≥ | 4.99 | 4.57 | 4.22 | 3.92 | 3.66 | 3.43 | 3.24 | 2.90 | 2.63 | 2.41 | 2.23 | 2.07 | 1.93 | 1.81 | 1.81 |
| | 10 ≥ | 6.23 | 5.71 | 5.27 | 4.89 | 4.57 | 4.29 | 4.04 | 3.62 | 3.29 | 3.01 | 2.78 | 2.58 | 2.41 | 2.26 | 2.26 |

FIG.8

THIRD COEFFICIENT TABLE

| | | REFERENCE TEMPERATURE | INCREASE VALUE [°C] | | | | | | | | | | | |
|---|---|---|---|---|---|---|---|---|---|---|---|---|---|---|
| | | | ≤ 0 | ≤ 1 | ≤ 2 | ≤ 3 | ≤ 4 | ≤ 5 | ≤ 6 | ≤ 7 | ≤ 8 | ≤ 9 | ≤ 10 | 10 < |
| ABSOLUTE HUMIDITY [g/cm$^3$] | A ≤ 1 | 8 | 0 | 0 | 0 | 0 | 0 | −0.005 | −0.01 | −0.02 | −0.03 | −0.04 | −0.03 | −0.02 |
| | 1 < A ≤ 2 | 10 | 0 | 0 | 0 | 0 | 0 | 0 | −0.005 | −0.01 | −0.02 | −0.03 | −0.02 | −0.01 |
| | 2 < A ≤ 3 | 11 | 0 | 0 | 0 | 0 | 0 | 0 | 0 | −0.005 | −0.01 | −0.02 | −0.01 | 0 |
| | 3 < A ≤ 4 | 13 | 0 | 0 | 0 | 0 | 0 | 0 | 0 | 0 | −0.005 | −0.01 | 0 | 0.005 |
| | 4 < A ≤ 5 | 14 | 0 | 0 | 0 | 0 | 0 | 0 | 0 | 0 | 0 | 0 | 0.005 | 0.01 |
| | 5 < A ≤ 6.5 | 16 | 0 | 0 | 0 | 0 | 0 | 0 | 0 | 0 | 0 | 0.005 | 0.01 | 0.015 |
| | 6.5 < A ≤ 8 | 18 | 0 | 0 | 0 | 0 | 0 | 0 | 0 | 0 | 0.005 | 0.01 | 0.015 | 0.02 |
| | 8 < A ≤ 10 | 19 | 0 | 0 | 0 | 0 | 0 | 0 | 0 | 0.005 | 0.01 | 0.015 | 0.02 | 0.025 |
| | 10 < A ≤ 12 | 21 | 0 | 0 | 0 | 0 | 0 | 0 | 0 | 0.005 | 0.01 | 0.015 | 0.02 | 0.025 |
| | 12 < A ≤ 14 | 22 | 0 | 0 | 0 | 0 | 0 | 0 | 0.005 | 0.01 | 0.015 | 0.02 | 0.025 | 0.03 |
| | 14 < A ≤ 16 | 24 | 0 | 0 | 0 | 0 | 0 | 0 | 0.015 | 0.01 | 0.015 | 0.02 | 0.025 | 0.03 |
| | 16 < A ≤ 18 | 26 | 0 | 0 | 0 | 0 | 0 | 0.005 | 0.01 | 0.015 | 0.02 | 0.025 | 0.03 | 0.035 |
| | 18 < A ≤ 21 | 27 | 0 | 0 | 0 | 0 | 0 | 0.005 | 0.01 | 0.015 | 0.02 | 0.025 | 0.03 | 0.035 |
| | 21 < A ≤ 24 | 29 | 0 | 0 | 0 | 0 | 0.005 | 0.01 | 0.015 | 0.02 | 0.025 | 0.03 | 0.035 | 0.04 |
| | 24 < A ≤ 28 | 30 | 0 | 0 | 0 | 0 | 0.005 | 0.01 | 0.015 | 0.02 | 0.025 | 0.03 | 0.035 | 0.04 |
| | 28 < A | 32 | 0 | 0 | 0 | 0 | 0.005 | 0.01 | 0.015 | 0.02 | 0.025 | 0.03 | 0.035 | 0.04 |

FIG.12

| UTILIZED EXPRESSION (COEFFICIENT) | VARIATION MAXIMUM VALUE | ATVC | | ENVIRONMENT | | | OPERATING RATIO |
|---|---|---|---|---|---|---|---|
| | | VOLTAGE VALUE | CURRENT VALUE | TEMPERATURE | HUMIDITY | ABSOLUTE MOISTURE AMOUNT | |
| EXPRESSION (1) : (C1, C2, C3) | 27% | ● | ● | ● | ● | ● | ● |
| EXPRESSION (2) : (C2, C3) | 35% | ● | ● | ● | ● | ● | — |
| EXPRESSION (3) : (–) | 225% | ● | ● | — | — | — | — |

FIG.13

FIRST COEFFICIENT TABLE (MODIFICATION)

| OPERATING RATIO [%] | | ≤ 10 | ≤ 20 | ≤ 30 | ≤ 40 | ≤ 50 | ≤ 60 | ≤ 70 | ≤ 80 | ≤ 90 | ≤ 100 |
|---|---|---|---|---|---|---|---|---|---|---|---|
| ABSOLUTE MOISTURE AMOUNT [g/cm$^3$] | ~2 | 1 | 1.05 | 1.1 | 1.15 | 1.15 | 1.15 | 1.15 | 1.1 | 1.05 | 1 |
| | ~14 | 1 | 1 | 1 | 1 | 0.95 | 0.95 | 0.95 | 0.95 | 0.9 | 0.9 |
| | 14~ | 1 | 0.98 | 0.96 | 0.94 | 0.92 | 0.9 | 0.88 | 0.86 | 0.84 | 0.82 |

IMAGE FORMING APPARATUS AND IMAGE FORMING SYSTEM

Japanese Patent Application No. 2016-243675 filed on Dec. 15, 2016, including description, claims, drawings, and abstract the entire disclosure is incorporated herein by reference in its entirety.

BACKGROUND

Technological Field

The present disclosure relates to an image forming apparatus and an image forming system, and particularly to an image forming apparatus including a conductive member to which a bias voltage is applied in image formation, and an image forming system including the image forming apparatus.

Description of the Related Art

Conventionally, an image forming apparatus includes a transfer roller as an example of a conductive member to which a bias voltage is applied in image formation. For such an image forming apparatus, there have been various techniques proposed for specifying the consumption degree of the conductive member. For example, Japanese Laid-Open Patent Publication No. 2004-184601 discloses the technique for determining whether a transfer roller in an image forming apparatus has reached the end of its life or not. More specifically, the image forming apparatus in Japanese Laid-Open Patent Publication No. 2004-184601 calculates the resistance value of the transfer roller based on the transfer current value and the transfer voltage value. Then, when the calculated resistance value exceeds the reference resistance value, the image forming apparatus determines that the transfer roller has reached the end of its life.

Furthermore, in Japanese Laid-Open Patent Publication No. 2003-195700, the humidity inside the image forming apparatus is used for determining whether the transfer roller has reached the end of its life or not. More specifically, in the image forming apparatus, the group of the data about a voltage value En to be applied to the transfer roller and the data about a temperature T and humidity H inside the image forming apparatus are associated with the result of whether the transfer roller has reached the end of its life or not. Then, the image forming apparatus sequentially detects these three types of data. Based on the result associated with these three types of detected data, the image forming apparatus determines whether the transfer roller has reached the end of its life or not.

In recent years, environmental considerations have been demanded for products. There are demands to extend the life span of each of components constituting a product, and to improve the prediction accuracy of the timing of replacing these components. In view of the above, there are demands for the image forming apparatus to more accurately calculate the consumption degree of the conductive member, to thereby more accurately calculate the timing of replacing the conductive member.

SUMMARY

To achieve at least one of the abovementioned objects, according to an aspect of the present invention, an image forming apparatus is provided, which includes: a conductive member to which a bias voltage is supplied in image formation; and a controller that controls an operation of the image forming apparatus. The controller calculates an operating ratio indicating a percentage of a time period during which the conductive member is used, and calculates a value indicating a consumption degree of the conductive member based on the calculated operating ratio and a magnitude of an electrical resistance of the conductive member.

According to another aspect of the present disclosure, an image forming system is provided, in which a plurality of image forming apparatuses as described above are connected so as to be capable of communicating with one another. One image forming apparatus of the plurality of image forming apparatuses includes the controller that: ranks the one image forming apparatus including the controller and other image forming apparatuses regarding the value indicating the consumption degree; and when receiving a print job, as a value of a bias voltage predicted to be applied to a conductive member in the print job is higher, selects an image forming apparatus with a lower value indicating the consumption degree from among the one image forming apparatus including the controller and other image forming apparatuses as an image forming apparatus caused to execute the print job.

According to still another aspect of the present disclosure, an image forming system is provided, which includes a plurality of image forming apparatuses and an information processing apparatus that is capable of communicating with the plurality of image forming apparatuses. Each of the plurality of image forming apparatuses includes a controller and a conductive member to which a bias voltage is supplied in image formation. The controller calculates an operating ratio indicating a percentage of a time period during which the conductive member is used, and calculates a value indicating a consumption degree of the conductive member based on the operating ratio and a magnitude of an electrical resistance of the conductive member. The information processing apparatus may also include an interface accepting selection of one or more image forming apparatuses each caused to execute a print job from among the plurality of image forming apparatuses. As a value of the bias voltage predicted to be applied to the conductive member in the print job is higher, the interface accepts selection for specifying an image forming apparatus with a lower value indicating the consumption degree from among the plurality of image forming apparatuses as an image forming apparatus caused to execute the print job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram showing an example of a table (the first coefficient table) of values for setting the first coefficient.

FIG. 6 is a diagram showing an example of a table (auxiliary table) of values for specifying a modification of an operating ratio.

FIG. 7 is a diagram showing an example of a table (the second coefficient table) of values for setting the second coefficient.

FIG. 8 is a diagram showing an example of a table (the third coefficient table) of values for setting the third coefficient.

FIG. 12 is a diagram showing an example of evaluations for graphs in FIGS. 9 to 11.

FIG. 13 is a diagram showing a modification of the first coefficient table.

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts or components are denoted with the same signs. Their names and functions are also the same, and a description thereof will not be repeated.

[Summary of Disclosure]

An image forming apparatus according to the present disclosure includes a conductive member to which a bias voltage is supplied in image formation. An example of the conductive member is a transfer roller. The image forming apparatus acquires the operating ratio of the conductive member (for example, the percentage of the time period during which the conductive member is used in the latest prescribed time period), and then, based on the magnitude of the electrical resistance of the conductive member and the acquired operating ratio, calculates a value indicating the consumption degree of the conductive member.

The value of the electrical resistance of the conductive member may increase in accordance with an increase in the percentage of the time period during which the conductive member is used, even if the consumption degree of the conductive member remains the same. By calculating the consumption degree of the conductive member as described above, the value indicating the consumption degree of the conductive member can be more accurately calculated.

In the image forming apparatus, the percentage of the time period during which a voltage is applied to the secondary transfer roller is employed as an example of the operating ratio. In the image forming apparatus, the percentage of the time period during which the image forming apparatus performs an image forming operation is employed as another example of the operating ratio.

[Operating Ratio and Electrical Resistance of Conductive Member]

Figure 1:
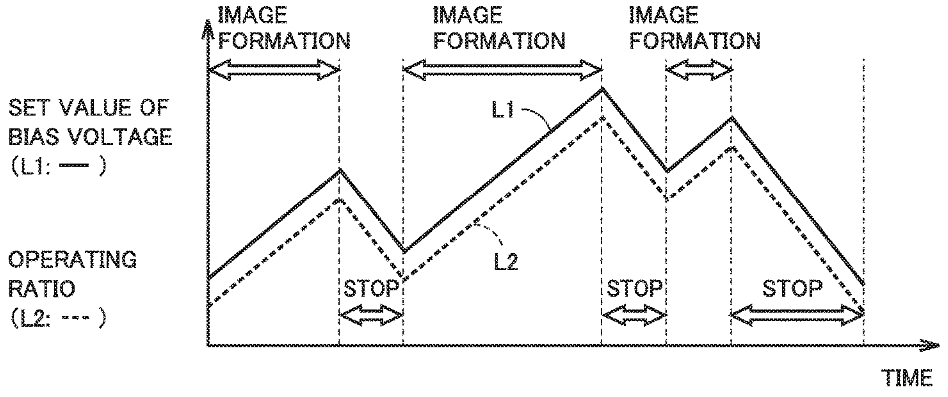
FIG. 1 is a diagram for illustrating the relation between a bias voltage and an operating ratio of a secondary transfer roller in an image forming apparatus.

FIG. 1 is a diagram for illustrating the relation between the bias voltage and the operating ratio of the secondary transfer roller in the image forming apparatus. Referring to FIG. 1, an explanation will be given with regard to the situation where the electrical resistance of the conductive member is higher as the operating ratio of the conductive member is higher.

In FIG. 1, a solid line (line L1) shows the temporal change in the set value of the bias voltage of the secondary transfer roller as an example of a conductive member. A dashed line (line L2) shows the operating ratio of the secondary transfer roller.

The value of the bias voltage of the secondary transfer roller is set in the active transfer voltage control (ATVC) operation, for example. The ATVC operation is performed, for example, each time a predetermined condition is satisfied (for example, an image has been formed on a prescribed number of sheets of paper). In the ATVC operation, the bias voltage is set at a value at which an appropriate transfer current flows through the secondary transfer roller. The details of the ATVC operation will be described later.

The operating ratio of the secondary transfer roller shows the use rate of the secondary transfer roller, which is the percentage of the time period during which a voltage is applied to the secondary transfer roller. FIG. 1 shows arrows each indicating the state of the image forming apparatus (the state where image formation is in progress or stopped). During image formation, a bias voltage is applied to the secondary transfer roller.

The operating ratio will be hereinafter more specifically described. For example, it is hereinafter assumed that "one hour" is defined as an example of a prescribed time period. When the image forming operation is started precisely at 9:00 a.m. and continued until 10:00 a.m., the latest prescribed time period (one hour) (that is, the operating ratio from 9:00 a.m. to 10:00 a.m.) is 100%. Then, when the image forming operation is stopped precisely from 10:00 a.m. to 10:30 a.m., the latest prescribed time period (one hour) (that is, the operating ratio from 9:30 a.m. to 10:30 a.m.) is 50%. This is because, in the latest time period of one hour, the bias voltage is applied to the secondary transfer roller for 30 minutes from 9:30 a.m. precisely to 10:00 a.m., whereas the bias voltage is not applied to the secondary transfer roller for 30 minutes precisely from 10:00 a.m. to 10:30 a.m.

As shown in FIG. 1, in the image forming apparatus, when the operating ratio of the secondary transfer roller increases (line L2), the set value of the bias voltage increases (line L1). One of the reasons causing this situation is assumed that a voltage is applied to the secondary transfer roller formed of an ion conductive material in a highly dense manner in terms of time (continuously or at short time intervals), thereby causing unbalanced ion distribution in the secondary transfer roller irrespective of consumption of the secondary transfer roller. It is considered that such an unbalanced ion distribution may be gradually eliminated in a time period during which a voltage is not applied to the secondary transfer roller.

[ATVC Operation]

The image forming apparatus sets the value of the bias voltage to be applied so as to cause an appropriate transfer current to flow through a conductive member (for example, the secondary transfer roller) in the ATVC operation. The timing at which the ATVC operation is performed is, for example, defined as follows: (1) during the initial setting in which power is turned on to the image forming apparatus; (2) at the time of return from the standby state; (3) at the time when a user performs an operation to instruct execution; (4) each timer an image is formed on a prescribed number of sheets of paper; (5) at the time when the temperature inside the image forming apparatus is changed by a prescribed value or more from the previous execution of the ATVC operation; and/or, (6) during the time period from after the start of the image forming operation until a sheet of paper reaches the secondary transfer roller. If high productivity (a fast printing speed) is not required, the image forming apparatus may perform the ATVC operation each time an image is formed on a sheet of paper.

[Configuration Example of Image Forming Apparatus]

(Schematic Configuration)

Figure 2:
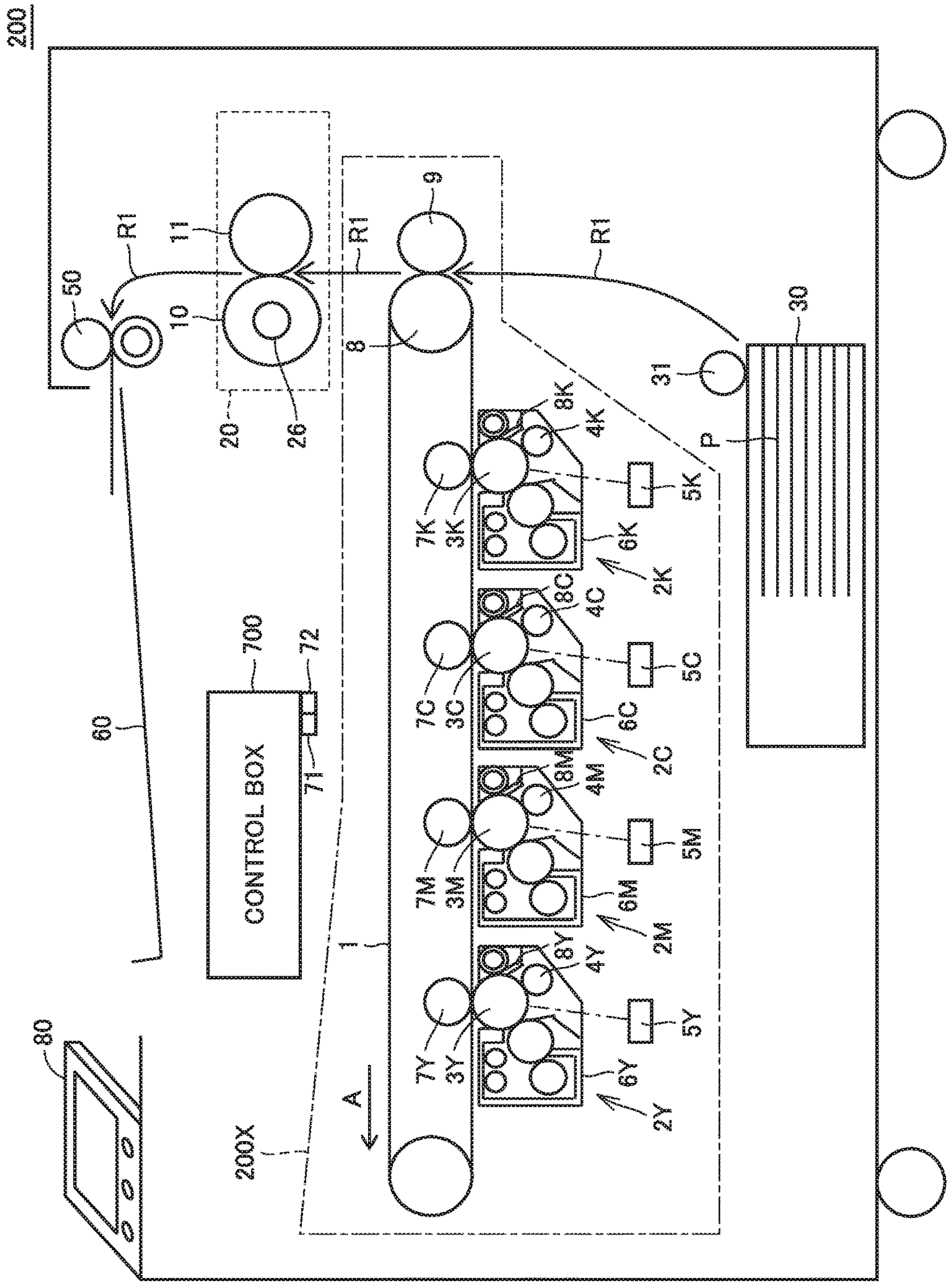
FIG. 2 is a diagram illustrating a configuration example of an image forming apparatus according to an embodiment.

FIG. 2 is a diagram illustrating a configuration example of an image forming apparatus 200 according to an embodiment. In an embodiment, image forming apparatus 200 serves as an electrophotographic-type image forming apparatus such as a laser printer and a light emitting diode (LED) printer. As shown in FIG. 2, image forming apparatus 200 includes a control box 700 in which elements including a control circuit (a controller 70 described later) for controlling the operation of image forming apparatus 200 are housed. Control box 700 is provided with a temperature sensor 71 for measuring the temperature inside image forming apparatus 200 and a humidity sensor 72 for measuring the humidity inside image forming apparatus 200. The positions of temperature sensor 71 and/or humidity sensor 72 are/is not limited to those/that shown in FIG. 2.

Image forming apparatus 200 includes an intermediate transfer roller 1 as a belt member so as to be located approximately in the center portion on the inside thereof. Below the lower horizontal portion of intermediate transfer roller 1, four imaging units 2Y, 2M, 2C, and 2K corresponding to colors of yellow (Y), magenta (M), cyan (C), and black (K), respectively, are arranged side by side along intermediate transfer roller 1. These four imaging units 2Y, 2M, 2C, and 2K include photoreceptors 3Y, 3M, 3C, and 3K, respectively, each of which is configured to be capable of carrying a toner image.

Charging rollers 4Y, 4M, 4C, and 4K; print head units 5Y, 5M, 5C, and 5K; developing rollers 6Y, 6M, 6C, and 6K; and primary transfer rollers 7Y, 7M, 7C, and 7K are arranged sequentially around photoreceptors 3Y, 3M, 3C, and 3K, respectively, serving as image carriers so as to extend in the rotation direction of their respective photoreceptors. Primary transfer rollers 7Y, 7M, 7C, and 7K are located to face photoreceptors 3Y, 3M, 3C, and 3K, respectively, with intermediate transfer roller 1 interposed therebetween.

A secondary transfer roller 9 is pressed to contact a portion of intermediate transfer roller 1 that is supported by an intermediate transfer belt driving roller 8. In this portion, secondary transfer is carried out. An example of the material of secondary transfer roller 9 is conductive rubber, for example. At the downstream position of a conveying path R1 in the rearward of the secondary transfer region, a fixing heating unit 20 including a fixing roller 10 and a pressurizing roller 11 is arranged. Fixing roller 10 includes a heater 26.

A sheet supply cassette 30 is arranged below image forming apparatus 200 in an attachable/detachable manner. A stack of sheets P loaded and housed within sheet supply cassette 30 is to be fed one by one from the topmost sheet of the stack into conveying path R1 in accordance with rotation of a paper feeding roller 31. Sheet P is an example of a recording medium.

An operation panel 80 is disposed on image forming apparatus 200. By way of example, operation panel 80 is configured from: a screen having a touch panel and a display stacked on one another; and a physical button.

In a certain aspect, each of intermediate transfer roller 1, charging rollers 4Y, 4M, 4C, and 4K, primary transfer rollers 7Y, 7M, 7C, and 7K, and secondary transfer roller 9 may function as a conductive member with ion conductivity. By way of example, these conductive members may include ion conductive rubber obtained by blending hydrin rubber, acrylonitrile-butadiene rubber, epichlorohydrin rubber, and the like. Each of these conductive members may include an appropriate ion conductive material depending on the required characteristics.

Image forming apparatus 200 in the above-described example is configured in a tandem-type intermediate transfer system, but is not limited thereto. Specifically, image forming apparatus 200 only has to include a conductive member with ion conductivity, and may be an image forming apparatus adopting a cycle system, or may be an image forming apparatus adopting a direct transfer system by which toner is directly transferred from a developing device onto a printing medium.

(Summarized Operation)

Then, the summarized operation of image forming apparatus 200 will be hereinafter described. When an image signal is input from an external device (for example, a personal computer or the like) into controller 70 (for example, provided inside control box 700) of image forming apparatus 200, controller 70 acts to produce a digital image signal that is obtained by color conversion of this image signal into yellow, cyan, magenta, and black. Then, based on the input digital signal, controller 70 causes each of print head units 5Y, 5M, 5C, and 5K of imaging units 2Y, 2M, 2C, and 2K to emit light for exposure.

Thereby, electrostatic latent images formed on photoreceptors 3Y, 3M, 3C, and 3K are developed by developing units 6Y, 6M, 6C and 6K, respectively, so as to form toner images in their respective colors. By the actions of primary transfer rollers 7Y, 7M, 7C, and 7K, the toner images in respective colors are primarily transferred so as to be sequentially overlaid on intermediate transfer roller 1 that moves in the direction indicated by an arrow A in FIG. 2.

In this way, the toner images formed on intermediate transfer roller 1 are collectively secondarily transferred onto sheet P by the action of secondary transfer roller 9.

The toner images secondarily transferred onto sheet P reach fixing heating unit 20. The toner images are fixed on sheet P by the actions of heated fixing roller 10 and pressurizing roller 11. Sheet P having the toner images fixed thereon is discharged through a paper discharge roller 50 onto a paper discharge tray 60.

(Configuration in Vicinity of Secondary Transfer Roller)

Figure 3:
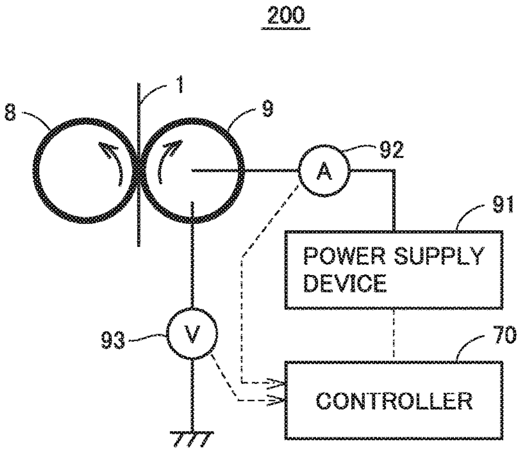
FIG. 3 is a diagram showing a configuration example in the vicinity of the secondary transfer roller in the image forming apparatus in FIG. 2.

FIG. 3 is a diagram showing a configuration example in the vicinity of secondary transfer roller 9 in image forming apparatus 200 in FIG. 2. As shown in FIG. 3, secondary transfer roller 9 faces intermediate transfer belt driving roller 8 with intermediate transfer roller 1 interposed therebetween. Each of a power supply device 91 and a voltmeter 93 is electrically connected to secondary transfer roller 9. An amperemeter 92 is connected between power supply device 91 and secondary transfer roller 9. Amperemeter 92 measures the value of the current flowing through secondary transfer roller 9. Voltmeter 93 measures the value of the voltage applied to secondary transfer roller 9. Power supply device 91, amperemeter 92 and voltmeter 93 are electrically connected to controller 70.

Controller 70 may control power supply device 91 to supply a constant current to secondary transfer roller 9 and acquire the measurement value of voltmeter 93 obtained at that time. Thereby, controller 70 can indirectly acquire the resistance value of secondary transfer roller 9. In another aspect, controller 70 may apply a constant voltage to secondary transfer roller 9 to acquire the value of the current flowing therethrough at that time, thereby acquiring the resistance value of secondary transfer roller 9.

(Partial Hardware Configuration)

Figure 4:
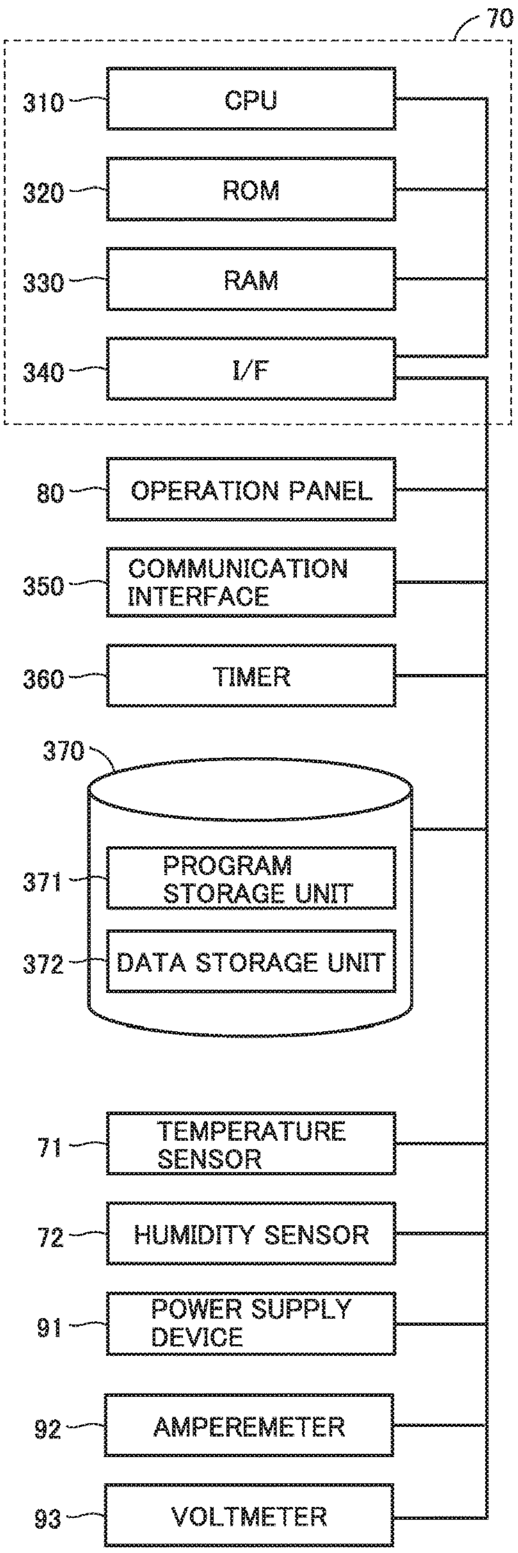
FIG. 4 is a diagram showing an example of a partial hardware configuration of the image forming apparatus in FIG. 2.

FIG. 4 is a diagram showing an example of a partial hardware configuration of image forming apparatus 200 in FIG. 2. As shown in FIG. 4, controller 70 includes, as its main control elements, a central processing unit (CPU) 310, a random access memory (RAM) 320, a read only memory (ROM) 330, and an interface (I/F) 340.

CPU 310 operates as a computer of image forming apparatus 200, to read and execute the control program stored in ROM 330 or a storage device 370 described later, thereby controlling the operation of image forming apparatus 200.

RAM 320 is typically a dynamic random access memory (DRAM) and the like. RAM 320 can temporarily store data and image data required for CPU 310 to execute the program. RAM 320 may function as a so-called working memory.

ROM 330, which is typically a flash memory or the like, may store a program to be executed by CPU 310 or various types of setting information related to the operation of image forming apparatus 200.

CPU 310 is electrically connected through an interface 340 to, and exchanges a signal with operation panel 80, a communication interface 350, a timer 360, and a storage device 370.

Communication interface 350 is a wireless local area network (LAN) card by way of example. Image forming apparatus 200 is configured to be capable of communicating through communication interface 350 with external devices (a personal computer, a smart phone, a tablet, and the like) connected to a LAN or a WAN (wide area network).

Timer 360 counts the time. By way of example, timer 360 is formed by a crystal oscillator.

Storage device 370 is typically formed by a hard disk drive. Storage device 370 includes a program storage unit 371 and a data storage unit 372. Program storage unit 371 may store a program executed by CPU 310. Data storage unit 372 may store the data utilized for the process in the present disclosure (for example, the first coefficient table, the second coefficient table, the third coefficient table, an auxiliary coefficient table, and the like).

Image forming apparatus 200 includes elements driven in the image forming operation. Controller 70 is connected to these elements and can control the operation of each of these elements. The elements include various types of rollers constituting imaging units 2Y, 2M, 2C, and 2K (FIG. 2), for example.

As shown in FIG. 4, CPU 310 is electrically connected to temperature sensor 71, humidity sensor 72, power supply device 91, amperemeter 92, and voltmeter 93.

[Coefficient Utilized for Consumption Rate of Secondary Transfer Roller 9]

CPU 310 calculates the consumption rate of secondary transfer roller 9. CPU 310 uses the calculated consumption rate, for example, to predict the timing suitable for replacing secondary transfer roller 9.

For calculating the consumption rate of secondary transfer roller 9, for example, CPU 310 acquires the magnitude of the resistance of secondary transfer roller 9, and further utilizes coefficients. Specific examples of coefficients include the first coefficient, the second coefficient and the third coefficient, which will be described below.

(First Coefficient)

FIG. 5 is a diagram showing an example of a table showing values for setting the first coefficient (the first coefficient table). In the first coefficient table in FIG. 5, the operating ratio and the absolute humidity inside image forming apparatus 200 are associated with each other. The absolute humidity is measured, for example by humidity sensor 72. The operating ratio is calculated, for example, based on the log about execution of the image forming operation of image forming apparatus 200 in the latest prescribed time period. The first coefficient table defines nine ranges for the operating ratio (an operating ratio R: $R \geq 20\%$, $20\% < R \leq 30\%$, $30\% < R \leq 40\%$, $40\% < R \leq 50\%$, $50\% < R \leq 60\%$, $60\% < R \leq 70\%$, $70\% < R \leq 80\%$, $80\% < R \leq 90\%$, and $90\% < R \leq 100\%$).

In the present disclosure, the length of the time period defined by the "prescribed time period" may be changed. For example, when the absolute humidity is 13 $g/cm^3$ and the operating ratio in the latest prescribed time period is 55%, the value of the first coefficient is set at "0.01" as described in the hatched box in FIG. 5.

(Specific Modification of Operating Ratio)

FIG. 6 is a diagram showing an example of a table showing values for specifying a modification of the operating ratio (auxiliary table). Referring to FIG. 6, a modification of a method of specifying the operating ratio will be hereinafter described.

In the auxiliary table in FIG. 6, two types of time periods and the "percentage of the time period of the operation in the image forming apparatus" are associated with each other. Two types of time periods include: an elapsed time period from power-on until the latest ATVC operation; and an elapsed time period from the sleep operation until the latest ATVC operation. The "percentage of the time period of the operation in the image forming apparatus" shows the percentage of the time period during which the image forming operation is performed from the time of power-on or return from the sleep operation until the target point of time.

For example, when the percentage of the time period during which the image forming operation is performed for 50 minutes after power-on is 55%, the operating ratio (utilized for setting the first coefficient) is set at "30%" as shown in the hatched box in FIG. 6.

(Second Coefficient)

FIG. 7 is a diagram showing an example of a table showing values for setting the second coefficient (the second coefficient table). In the second coefficient table in FIG. 7, the relative humidity and the temperature inside image forming apparatus 200 are associated with each other. The relative humidity is measured, for example, by humidity sensor 72. The temperature is measured, for example, by temperature sensor 71.

The second coefficient table defines seventeen ranges for the relative humidity. The range with the highest value defines a range in which the relative humidity exceeds 85%. The range with the second highest value defines a range in which the relative humidity exceeds 80% and is equal to or less than 85%. The range with the lowest value defines a range in which the relative humidity is equal to or less than 10%. The range with the second lowest value defines a range in which the relative humidity exceeds 10% and is less than 15%.

The second coefficient table defines fifteen ranges for the temperature. The range with the highest value defines a range in which the temperature exceeds 30° C. The range with the second highest value defines a range in which the temperature exceeds 28° C. and is equal to or less than 30° C. The range with the lowest value defines a range in which the temperature is equal to or less than 10° C. The range with the second lowest value defines a range in which the temperature exceeds 10° C. and is equal to or less than 11° C.

For example, when the relative humidity is 62% and the temperature is 23° C., the second coefficient is set at “1.00” as described in the hatched box in FIG. 7.

(Third Coefficient)

FIG. 8 is a diagram showing an example of a table showing values for setting the third coefficient (the third coefficient table). In the third coefficient table in FIG. 8, the absolute humidity inside image forming apparatus 200 and the value of the temperature inside image forming apparatus 200 that has increased from the time of power-on (also referred to as an “increase value”) are associated with each other.

The third coefficient table defines twelve ranges for the increase value of the temperature. The range with the highest value defines a range in which the temperature exceeds 10° C. The range with the second highest value defines a range in which the temperature exceeds 9° C. and is equal to or less than 10° C. The range with the lowest value defines a range in which the temperature is equal to or less than 0° C. The range with the second lowest value defines a range in which the temperature exceeds 0° C. and is equal to or less than 1° C.

For example, when the absolute humidity is 11 g/cm$^3$ and the increase value of the temperature is 7.5° C., the third coefficient is set at “0.01” as shown in the hatched box in FIG. 8.

The third coefficient table further defines a “reference temperature” associated with the absolute humidity. It is expected that the absolute humidity does not significantly change even if the state of image forming apparatus 200 changes. In view of the above, for image forming apparatus 200, in place of the temperature at power-on, the reference temperature corresponding to the absolute humidity inside image forming apparatus 200 may be utilized when the increase value of the temperature is calculated.

For example, when the absolute humidity is 11 g/cm$^3$, the reference temperature is set at 21° C. The difference between the current temperature and the reference temperature specified in this way is specified as an increase value of the temperature.

In the third coefficient table, the reference temperature may be associated with the absolute moisture amount in place of the absolute humidity. In this case, in image forming apparatus 200, in place of the temperature at power-on, the reference temperature corresponding to the absolute moisture amount inside image forming apparatus 200 may be utilized when the increase value of the temperature is calculated.

[Method of Calculating Consumption Rate of Secondary Transfer Roller]

The following expression (1) is an example of the expression utilized for calculating the consumption rate of secondary transfer roller 9.

$$\text{Consumption rate}=[\{(R\text{mes}\times C1\times C2\times C3)-Ri\}/(R\text{max}-Ri)]\times 100 \quad (1)$$

In the expression (1), Rmes is a measurement value of the resistance of secondary transfer roller 9. CPU 310 acquires the measurement value of the resistance of secondary transfer roller 9 according to the following expression (A), for example, using the measurement value (Vmes) of voltmeter 93 and the measurement value (Imes) of amperemeter 92.

$$I\text{mes}/V\text{mes}=R\text{mes} \quad (A)$$

C1 is the first coefficient. C2 is the second coefficient. C3 is the third coefficient.

Ri is a resistance value of secondary transfer roller 9 in the initial stage, for example, a resistance value of a brand-new secondary transfer roller 9 (at the time of shipment of image forming apparatus 200, immediately after replacement of secondary transfer roller 9, and the like). Rmax is a set value for the resistance of secondary transfer roller 9, and specifically a value of the resistance of secondary transfer roller 9 at the time when secondary transfer roller 9 is assumed to have reached the end of its life. Ri and Rmax may be stored in data storage unit 372 (FIG. 4) at the time of shipment of image forming apparatus 200, or may be downloaded through a network to image forming apparatus 200 and stored in data storage unit 372.

[Evaluation of Consumption Rate]

Figure 9:
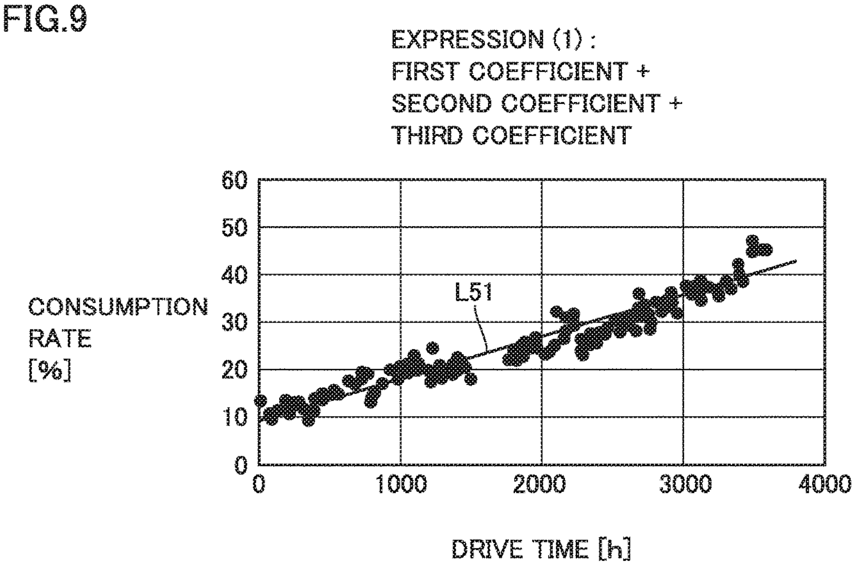
FIG. 9 is a diagram showing the consumption rate calculated utilizing an expression (1).
Figure 10:
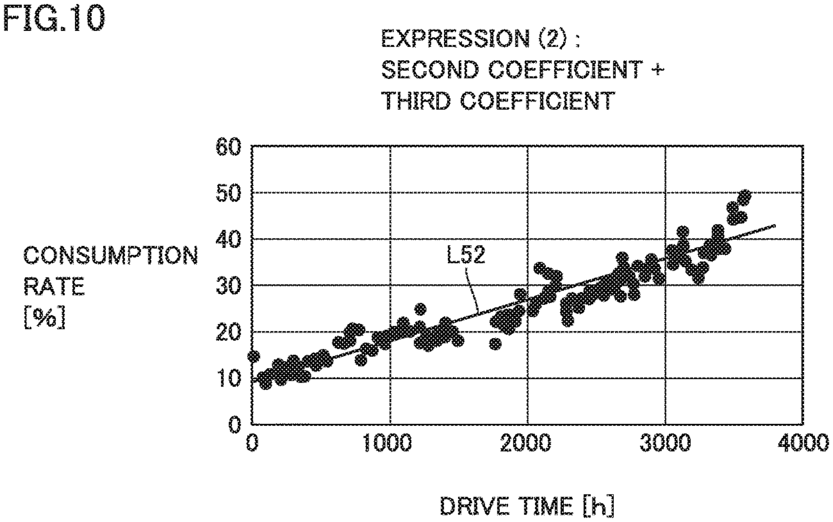
FIGS. 10 and 11 each are a diagram showing the consumption rate calculated according to a comparative example.
Figure 11:
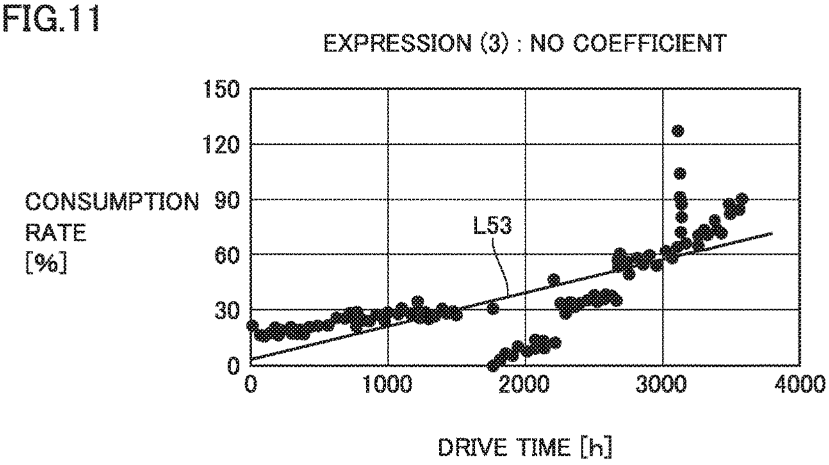

FIG. 9 is a diagram showing the consumption rate calculated utilizing the expression (1). FIGS. 10 and 11 each are a diagram showing the consumption rate calculated according to a comparative example. Each of the following expressions (2) and (3) shows an expression used for calculating the consumption rate as a comparative example with the expression (1).

$$\text{Consumption rate}=[\{(R\text{mes}\times C2\times C3)-Ri\}/(R\text{max}-Ri)]\times 100 \quad (2)$$

$$\text{Consumption rate}=\{(R\text{mes}-Ri)/(R\text{max}-Ri)\}\times 100 \quad (3)$$

The expression (1) utilizes the first coefficient, the second coefficient and the third coefficient, whereas the expression (2) does not utilize the first coefficient, and the expression (3) does not utilize all of the first coefficient to the third coefficient. FIG. 10 shows the consumption rate calculated utilizing the expression (2) while FIG. 11 shows the consumption rate calculated utilizing the expression (3).

In each of the graphs shown in FIGS. 9 to 11, the horizontal axis shows the time for which secondary transfer roller 9 is driven for the image forming operation while the vertical axis shows the calculated consumption rate. Each of the graphs shown in FIGS. 9 to 11 includes primary approximate lines (lines L51, L52, L53) for the calculation result of the consumption rate. The primary approximate line is generated, for example, using the least-squares method.

FIG. 12 is a diagram showing an example of evaluations for graphs in FIGS. 9 to 11. The table in FIG. 12 includes the item “Utilized Expression (Coefficient)” showing three types of expressions (expressions (1) to (3)). In the table in FIG. 12, the item “Variation Maximum Value” is associated with each expression. The variation maximum value is the maximum value of the separation distance from the primary approximate line in the calculation result of the consumption rate. For example, the variation maximum value for the expression (1) is a difference between the consumption rate of the plot that is most separated from line L51 and the consumption rate on line L51 corresponding to the same drive time as that to which the plot corresponds, as shown in FIG. 9.

FIG. 13 is a diagram showing a modification of the first coefficient table. As compared with FIG. 5, in the first coefficient table in FIG. 13, the absolute moisture amount in place of the absolute humidity is associated with the operating ratio. The first coefficient table in FIG. 13 defines three ranges for the absolute moisture amount. In the first range, the absolute moisture amount is in a range less than 2 g/cm$^3$. In the second range, the absolute moisture amount is in a range equal to or more than 2 g/cm$^3$ and less than 14 g/cm$^3$. In the third range, the absolute moisture amount is in a range equal to or more than 14 g/cm$^3$. According to the first coefficient table in FIG. 13, for example, when the absolute moisture amount is 12 g/cm$^3$ and the operating ratio is 50%, the first coefficient is set at 0.95 as shown in the hatched box in FIG. 13.

In FIG. 12, each of the items including ATVC (voltage value, current value) and environment (temperature, humidity, absolute moisture amount) shows whether each of these items is taken into consideration or not when the consumption rate shown in each of the graphs in FIGS. 9 to 11 is calculated. The symbol "●" shows that each item is taken into consideration and the symbol "—" shows that each item is not taken into consideration.

The item "ATVC (voltage value)" shows the voltage applied to secondary transfer roller 9. The item "ATVC (current value)" shows the current flowing through secondary transfer roller 9. The table in FIG. 12 shows that the item "ATVC (voltage value)" and the item "ATVC (current value)" each are taken into consideration in each of the expressions (1) to (3). This is because resistance value Rmes is used in each of the expressions (1) to (3), and Rmes is calculated from the voltage value and the current value of secondary transfer roller 9 in an example.

The item "environment (temperature)" shows the temperature inside image forming apparatus 200. The item "environment (humidity)" shows the relative humidity inside image forming apparatus 200. The item "environment (absolute moisture amount)" shows the absolute moisture amount inside image forming apparatus 200. The table in FIG. 12 shows that the item "environment (temperature)", the item "environment (humidity)", and the item "environment (absolute moisture amount)" each are taken into consideration in the expressions (1) and (2), but not taken into consideration in the expression (3). This means that the expression (3) does not include all of the first coefficient, the second coefficient and the third coefficient.

The item "operating ratio" shows the operating ratio of secondary transfer roller 9. The table in FIG. 12 shows that the item "operating ratio" is taken into consideration in the expression (1), but not taken into consideration in the expressions (2) and (3). This corresponds to the fact that the first coefficient is used only in the expression (1). Among the first coefficient to the third coefficient, only the first coefficient is set based on the operating ratio. The second coefficient and the third coefficient are set based on the values other than the operating ratio.

Then, referring to FIG. 12, an explanation will be hereinafter given with regard to the evaluation of the method of calculating the consumption rate based on the "variation maximum value" shown in FIG. 12. Essentially, the consumption rate of secondary transfer roller 9 should change according to the tendency that the consumption rate rises gradually as the drive time elapses. When the "variation maximum value" is relatively large, it indicates that the value greatly deviated from this tendency is calculated as an estimate value of the consumption rate. In view of the above, it can be said that the calculation method producing a larger "variation maximum value" leads to lower accuracy.

According to the result shown in FIG. 12, the variation maximum value corresponding to the expression (3) includes a value larger than the variation maximum values corresponding to the expressions (1) and (2). Thus, it can be said that the calculation method utilizing each of the expressions (1) and (2) is more accurate than the calculation method utilizing the expression (3). Furthermore, the variation maximum value corresponding to the expression (1) is smaller than the variation maximum value corresponding to the expression (2). Thus, it can be said that the calculation method utilizing the expression (1) is more accurate than the calculation method utilizing the expression (2). In the expression (1), the operating ratio that is not taken into consideration in the expressions (2) and (3) is taken into consideration. Accordingly, it can be said that the accuracy of calculating the consumption rate is improved by taking the operating ratio into consideration for calculating the consumption rate.

[Process Flow]

Figure 14:
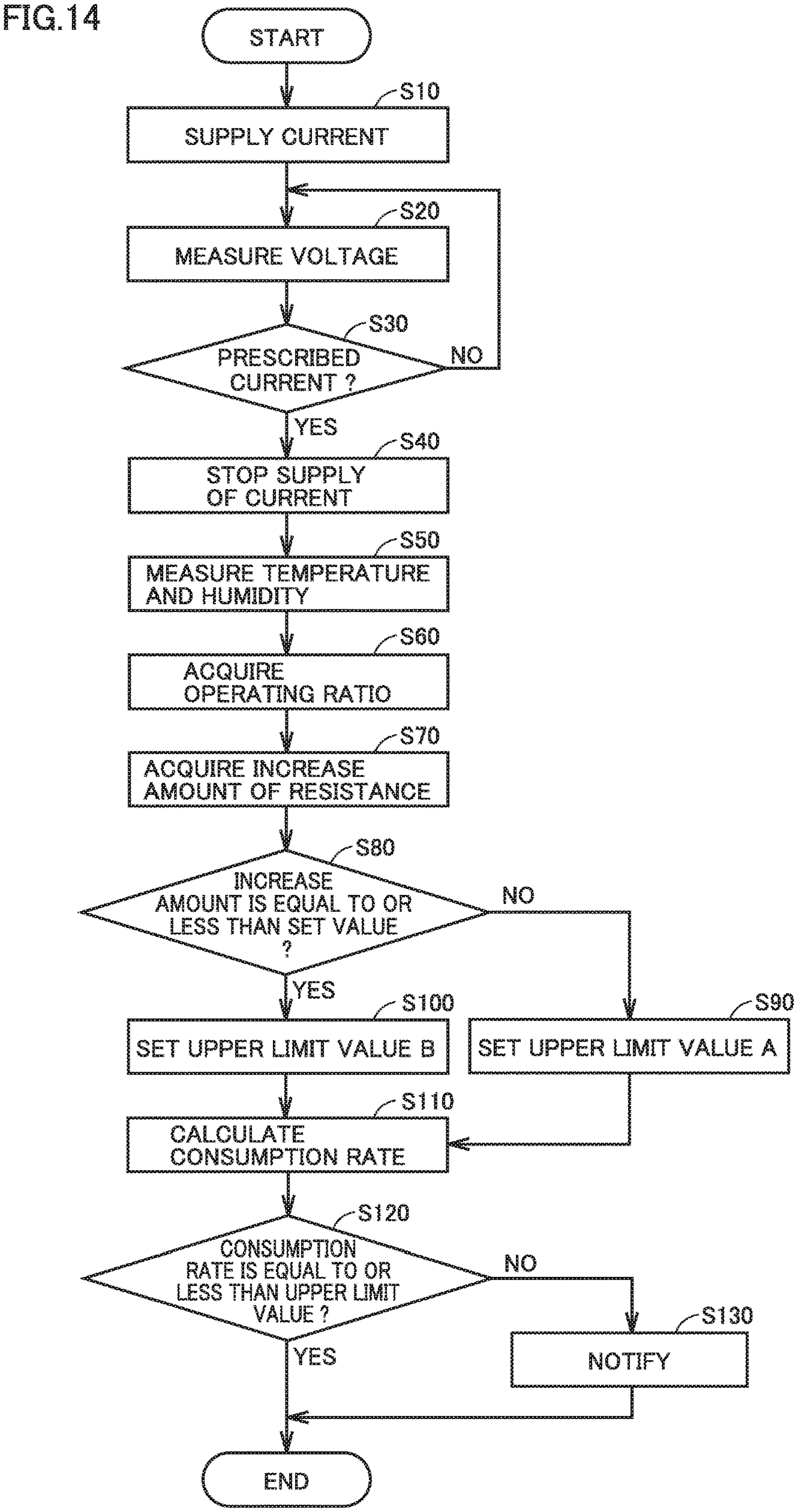
FIG. 14 is a flowchart of a process performed for calculating the consumption rate of the secondary transfer roller.

FIG. 14 is a flowchart of the process performed by CPU 310 (FIG. 4) for calculating the consumption rate of secondary transfer roller 9. CPU 310 executes, for example, the program stored in program storage unit 371, thereby implementing the process shown in FIG. 14. The timing at which the process shown in FIG. 14 is started is defined for example as follows: (1) at the time of executing the ATVC operation; (2) at the time when an instruction is input into operation panel 80; and/or (3) at the time when a certain time period has elapsed since the process in FIG. 14 was previously performed.

Referring to FIG. 14, in step S10, CPU 310 supplies a current for measurement (for example, about 30 μA) to secondary transfer roller 9.

In step S20, CPU 310 measures the voltage of secondary transfer roller 9, for example, by referring to the measurement result of voltmeter 93.

In step S30, CPU 310 determines whether the current of the value defined for measurement has been supplied to secondary transfer roller 9 or not. CPU 310 returns the control to step S20 until it determines that the current of this value has been supplied (NO in step S30). When CPU 310 determines that the current of the value has been supplied (YES in step S30), it advances the control to step S40.

In step S40, CPU 310 stops supply of the current to secondary transfer roller 9. In step S50, CPU 310 measures the temperature and the humidity inside image forming apparatus 200, for example, by referring to the measurement results of temperature sensor 71 and humidity sensor 72. Inside image forming apparatus 200, for example, means the space inside the housing that covers the outer shell of image forming apparatus 200.

In step S60, CPU 310 acquires the above-described operating ratio. In step S70, CPU 310 acquires the increase amount of the resistance in secondary transfer roller 9. The increase amount of the resistance is, for example, an amount of the resistance value increased from the start of use of secondary transfer roller 9 until the present point of time. For example, CPU 310 measures the resistance value of secondary transfer roller 9 at the start of use of secondary transfer roller 9 (at the time of shipment, at the time of replacement, or the like), stores the measured resistance value in data storage unit 372 as an initial value, measures the current resistance value of secondary transfer roller 9, and calculates the difference between the measured resistance value and the initial value, thereby acquiring the increase amount of the resistance.

In step S80, CPU 310 determines whether or not the increase amount of the resistance acquired in step S70 is equal to or less than a predetermined set value. When CPU 310 determines that the increase amount is equal to or less than the set value (YES in step S80), it advances the control to step S100. When CPU 310 determines that the increase amount exceeds the set value (NO in step S80), it advances the control to step S90.

In step S90, CPU 310 sets an upper limit value A as an upper limit value for the resistance in secondary transfer roller 9 (for example, Rmax in the expression (1)).

In step S100, CPU 310 sets an upper limit value B as an upper limit value for the resistance in secondary transfer roller 9. Upper limit value B set in step S100 is greater than upper limit value A set in step S90.

The upper limit value (upper limit value A or upper limit value B) set in step S90 or step S100 is located in the denominator of the expression (1). The greater the upper limit value is, the smaller the consumption rate calculated according to the expression (1) becomes. Thus, in the process in FIG. 14, as the increase amount of the resistance in secondary transfer roller 9 is smaller, the consumption rate calculated for secondary transfer roller 9 in a certain state is smaller. In image forming apparatus 200, for example, when the image forming operation is less frequently performed, the increase amount of the resistance in secondary transfer roller 9 tends to be decreased. As an example in which the image forming operation is less frequently performed, there is a situation where continuous image formation is not often executed. In the process in FIG. 14, when the image forming operation in image forming apparatus 200 is less frequently performed, the calculated consumption rate is further lowered, and the time period until replacement of secondary transfer roller 9 is estimated to be longer.

In step S110, CPU 310 calculates the consumption rate of secondary transfer roller 9. The consumption rate is calculated, for example, according to the expression (1).

In step S120, CPU 310 determines whether or not the consumption rate calculated in step S110 is equal to or less than the upper limit value that is set in one of step S90 and step S100. When CPU 310 determines that the calculated consumption rate is equal to or less than the upper limit value (YES in step S120), CPU 310 ends the process in FIG. 14. When CPU 310 determines that the calculated consumption rate exceeds the upper limit value (NO in step S120), it advances the control to step S130.

In step S130, through operation panel 80, CPU 310 gives a notification that secondary transfer roller 9 has reached the end of its life and/or that replacement of secondary transfer roller 9 is demanded.

Figure 15:
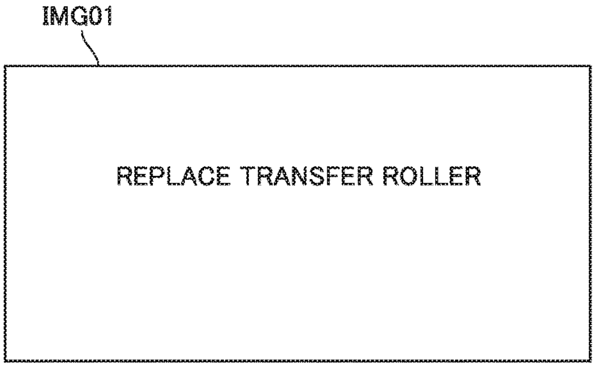
FIG. 15 is a diagram showing an example of a screen displayed on an operation panel.

FIG. 15 is a diagram showing an example of a screen displayed on operation panel 80 in step S130. A screen IMG01 in FIG. 15 includes a message of "Replace Transfer Roller". Then, the process in FIG. 14 ends.

In the process in FIG. 14, when CPU 310 determines in step S120 that the consumption rate exceeds the upper limit value, it may suspend execution of the image forming operation until it receives the information showing that secondary transfer roller 9 has been replaced. Thereby, it may be possible to avoid execution of the image forming operation in the state where the time has come to replace secondary transfer roller 9. Until CPU 310 receives the information showing that secondary transfer roller 9 has been replaced, CPU 310 may notify that execution of the image forming operation is suspended until secondary transfer roller 9 is replaced even if a print instruction is input.

Figure 16:
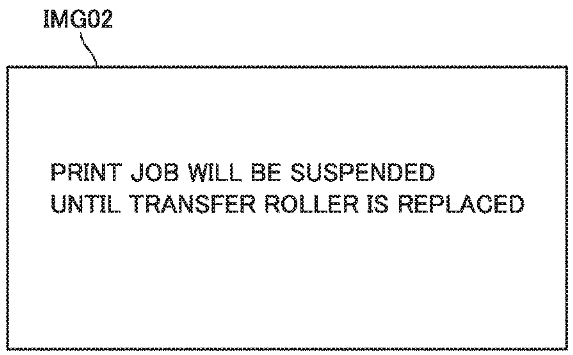
FIG. 16 is a diagram showing another example of the screen displayed on the operation panel.

FIG. 16 is a diagram showing another example of the screen displayed on operation panel 80. A screen IMG02 in FIG. 16 includes a message "Print Job will be Suspended until Transfer Roller is Replaced".

In the process in FIG. 14, CPU 310 may gives a notification about the calculated consumption rate irrespective of whether the consumption rate has reached the upper limit value or not. As an example, CPU 310 causes operation panel 80 to display the value of the calculated consumption rate.

[Network System]

Figure 17:
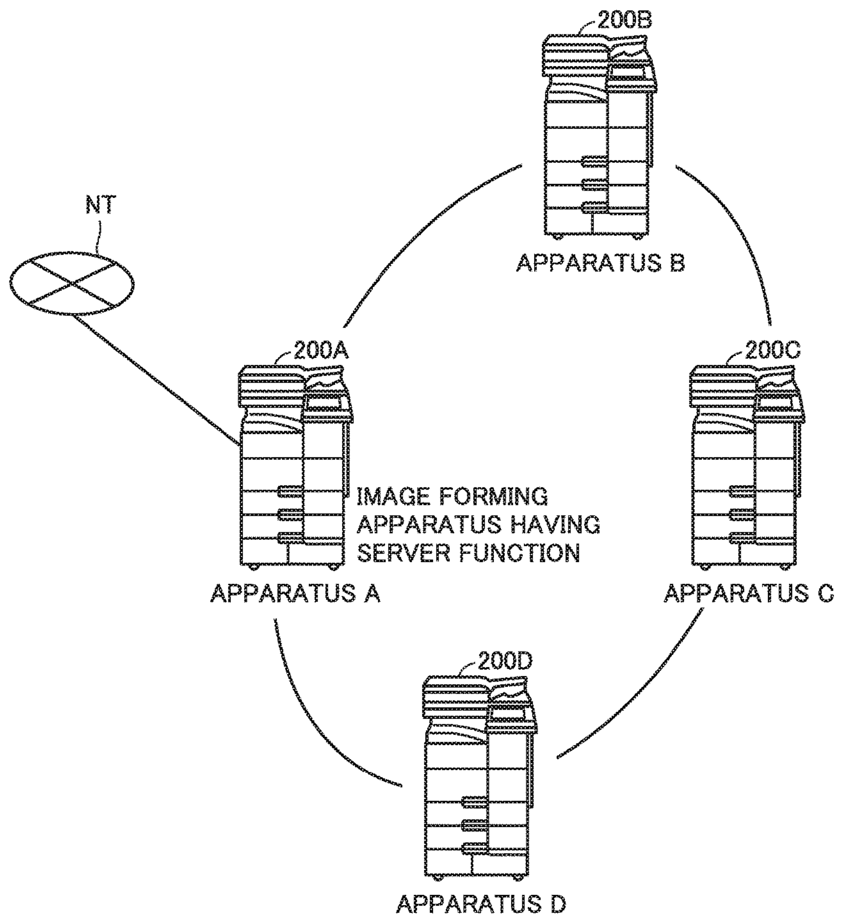
FIG. 17 is a diagram showing an embodiment in which a plurality of image forming apparatuses are connected so as to be capable of communicating with one another.

FIG. 17 shows an embodiment in which a plurality of image forming apparatuses are connected so as to be capable of communicating with one another. The network system shown in FIG. 17 includes four image forming apparatuses 200A, 200B, 200C, and 200D. Each of image forming apparatuses 200A to 200D may, for example, have the same hardware configuration as that of image forming apparatus 200 having been described above.

Image forming apparatus 200A receives an instruction to execute the print job through a network NT. CPU 310 in image forming apparatus 200A may instruct an image forming unit (a portion including an image carrier and the like in FIG. 2) in image forming apparatus 200A or other image forming apparatuses 200B to 200D to execute the print job defined by the received instruction.

Figure 18:
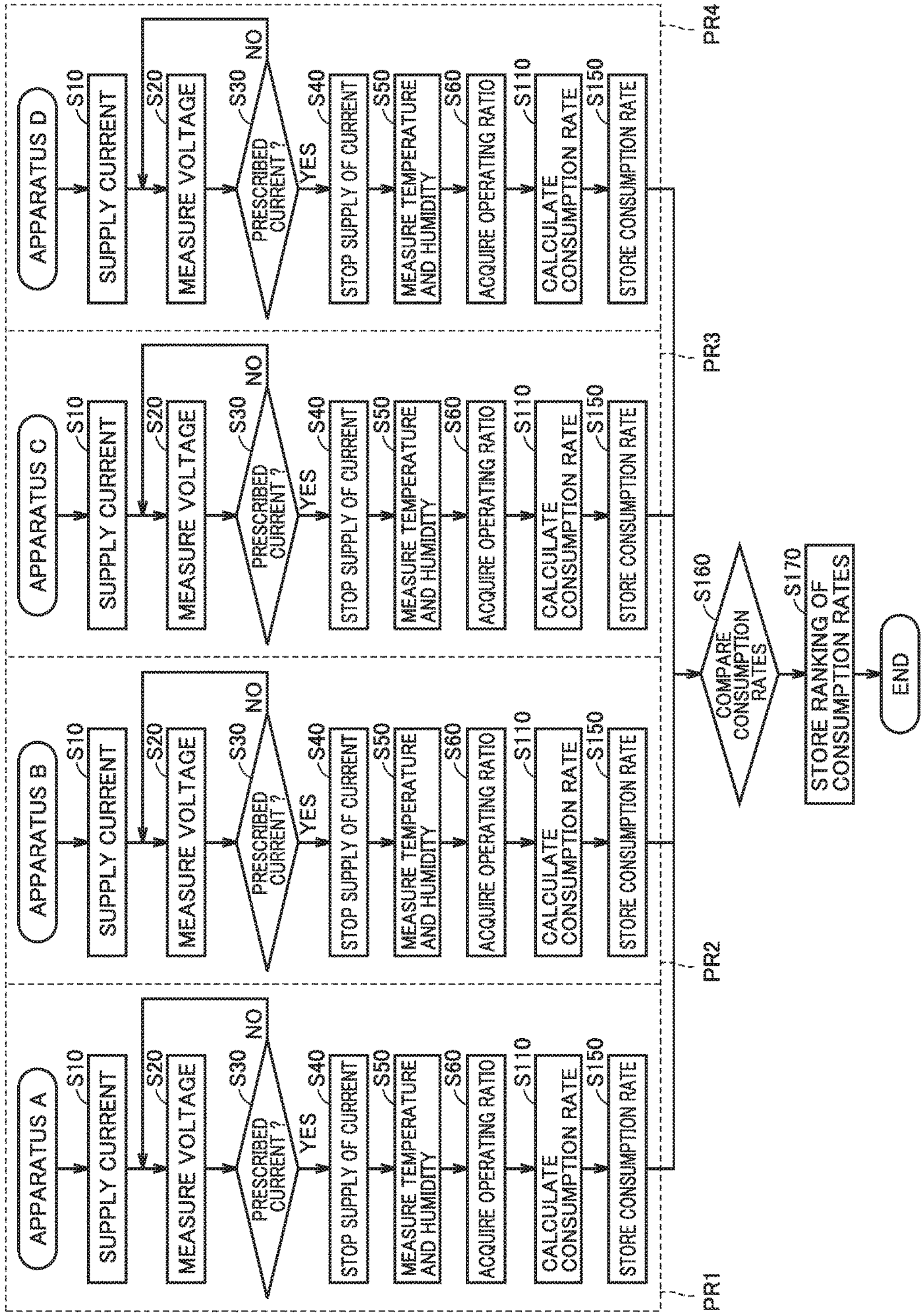
FIG. 18 is a flowchart of a process performed in a network system in FIG. 17.

FIG. 18 is a flowchart of the process performed in the network system in FIG. 17. In FIG. 18, frames PR1, PR2, PR3, and PR4 shows processes performed by image forming apparatuses 200A, 200B, 200C, and 200D, respectively. For example, the process in frame PR1 is performed by CPU 310 of image forming apparatus 200A. The process in frame PR2 is performed by CPU 310 of image forming apparatus 200B.

Each of frames PR1 to PR4 includes step S110 and step S150 in addition to steps S10 to step S60 in FIG. 14. In the process of each of frames PR1 to PR4, in step S60, CPU 310 of each image forming apparatus calculates the operating ratio of secondary transfer roller 9 in each image forming apparatus. Then, CPU 310 advances the control to step S110.

In step S110, CPU 310 calculates the consumption rate of secondary transfer roller 9 according to the expression (1).

In step S150, CPU 310 stores the consumption rate calculated in step S110 in data storage unit 372 of each image forming apparatus.

In the system in FIG. 17, CPU 310 of image forming apparatus 200A may function also as a printer server. In addition to the process in frame PR1, CPU 310 further performs step S160 and step S170 as a printer server.

In step S160, CPU 310 compares the consumption rates calculated in image forming apparatuses 200A to 200D.

In step S170, based on the result of comparison in step S160, CPU 310 ranks image forming apparatuses 200A to 200D regarding their consumption rates. The image forming apparatus with the highest consumption rate is listed as an image forming apparatus with "the first-ranked consumption rate". Then, the image forming apparatus with the second highest consumption rate is listed as an image forming apparatus with "the second-ranked consumption rate". This means that, the higher the rank is, the more the consumption degree of secondary transfer roller 9 progresses.

Figure 19:
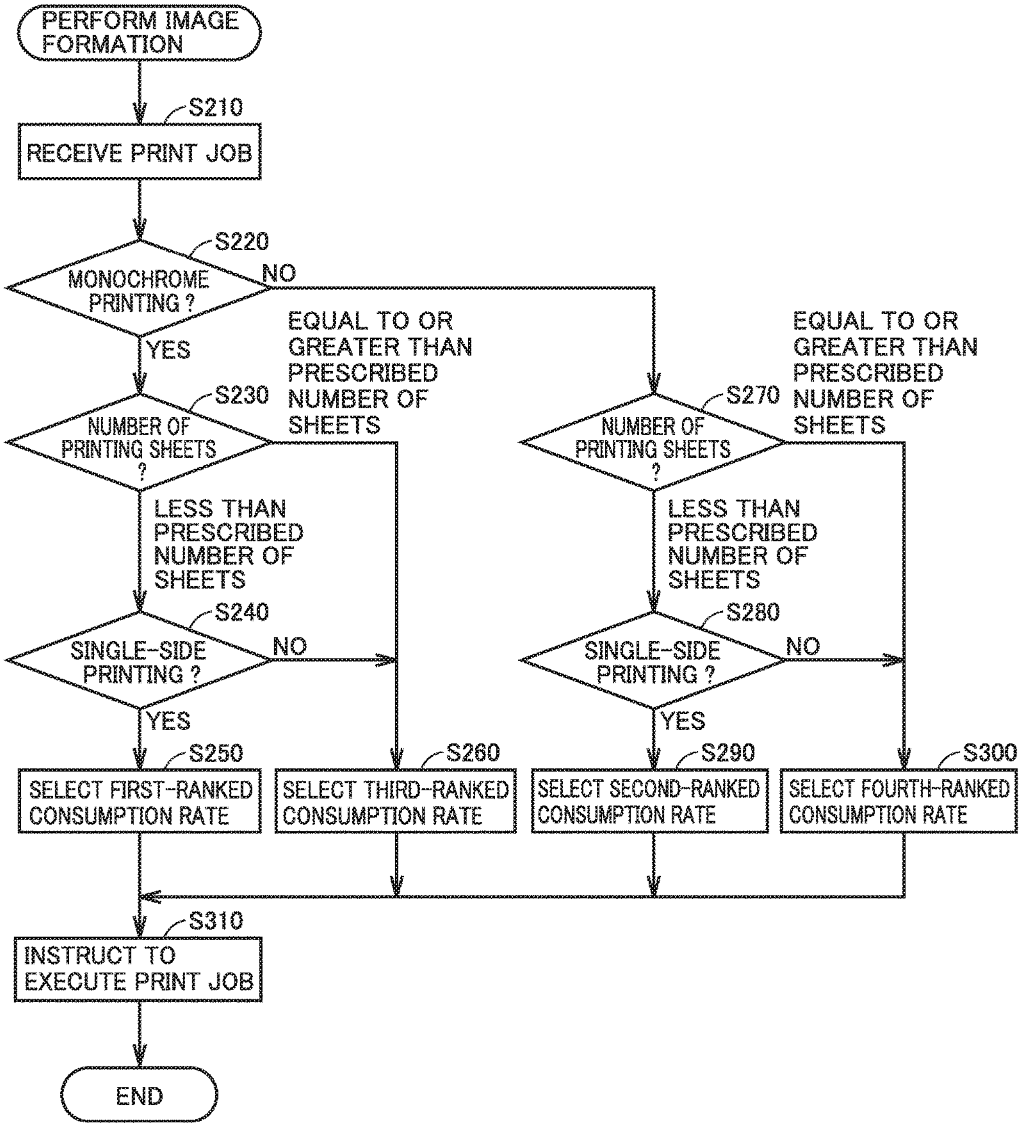
FIG. 19 is a flowchart of a process performed by an image forming apparatus functioning as a printer server in the network system in FIG. 17.

FIG. 19 is a flowchart of the process performed by CPU 310 of image forming apparatus 200A functioning as a printer server in the network system in FIG. 17.

In step S210, CPU 310 receives a print job, for example, through network NT (FIG. 17).

In step S220, CPU 310 determines whether the print job in step S210 is a job to perform monochrome printing or not. When CPU 310 determines that the print job is a job to perform monochrome printing (YES in step S220), it advances the control to step S230. When CPU 310 determines that the print job is not a job to perform monochrome printing (for example, a job to perform color printing) (NO in step S220), it advances the control to step S270.

In step S230, CPU 310 determines the number of sheets of paper to be printed (number of printing sheets) through the print job in step S210. When the number of printing sheets is equal to or greater than a prescribed number of sheets, CPU 310 advances the control to step S260. When the number of printing sheets is less than the prescribed number of sheets, CPU 310 advances the control to step S240. The information specifying the "prescribed number of sheets" is stored in data storage unit 372, for example.

In step S240, CPU 310 determines whether the print job in step S210 is a job to perform single-side printing or not. When CPU 310 determines that the print job is a job to perform single-side printing (YES in step S240), it advances the control to step S250. When CPU 310 determines that the print job is not a job to perform single-side printing (NO in step S240), it advances the control to step S260.

In step S250, CPU 310 sets the image forming apparatus instructing the print job in step S210 as an image forming apparatus with the first-ranked consumption rate in the network system.

In step S260, CPU 310 sets the image forming apparatus instructing the print job in step S210 as an image forming apparatus with the third-ranked consumption rate in the network system.

In step S270, CPU 310 determines the number of sheets of paper to be printed (the number of printing sheets) through the print job in step S210. When the number of printing sheets is equal to or greater than the prescribed number of sheets, CPU 310 advances the control to step S300. When the number of printing sheets is less than the prescribed number of sheets, CPU 310 advances the control to step S280.

In step S280, CPU 310 determines whether the print job in step S210 is a job to perform single-side printing or not. When CPU 310 determines that the print job is a job to perform single-side printing (YES in step S280), it advances the control to step S290. When CPU 310 determines that the print job is not a job to perform single-side printing (NO in step S280), it advances the control to step S300.

In step S290, CPU 310 sets the image forming apparatus instructing the print job in step S210 as an image forming apparatus with the second-ranked consumption rate in the network system.

In step S300, CPU 310 sets the image forming apparatus instructing the print job in step S210 as an image forming apparatus with the fourth-ranked consumption rate in the network system.

In step S310, CPU 310 instructs the image forming apparatus set in step S250, step S260, step S290, or step S300 to execute the print job in step S210, and then, ends the process in FIG. 19.

Figure 20:
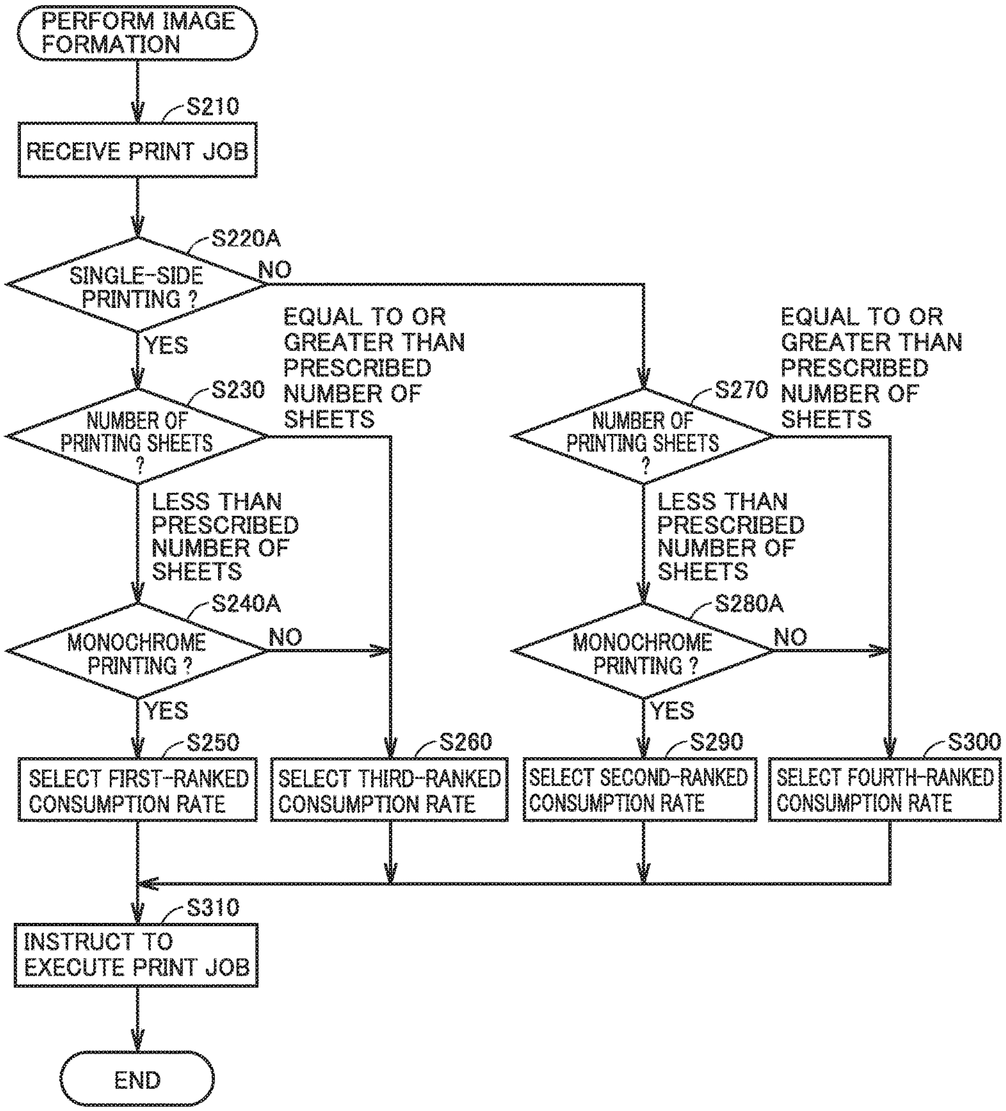
FIGS. 20 and 21 each are a flowchart showing a modification of the process in FIG. 19.
Figure 21:
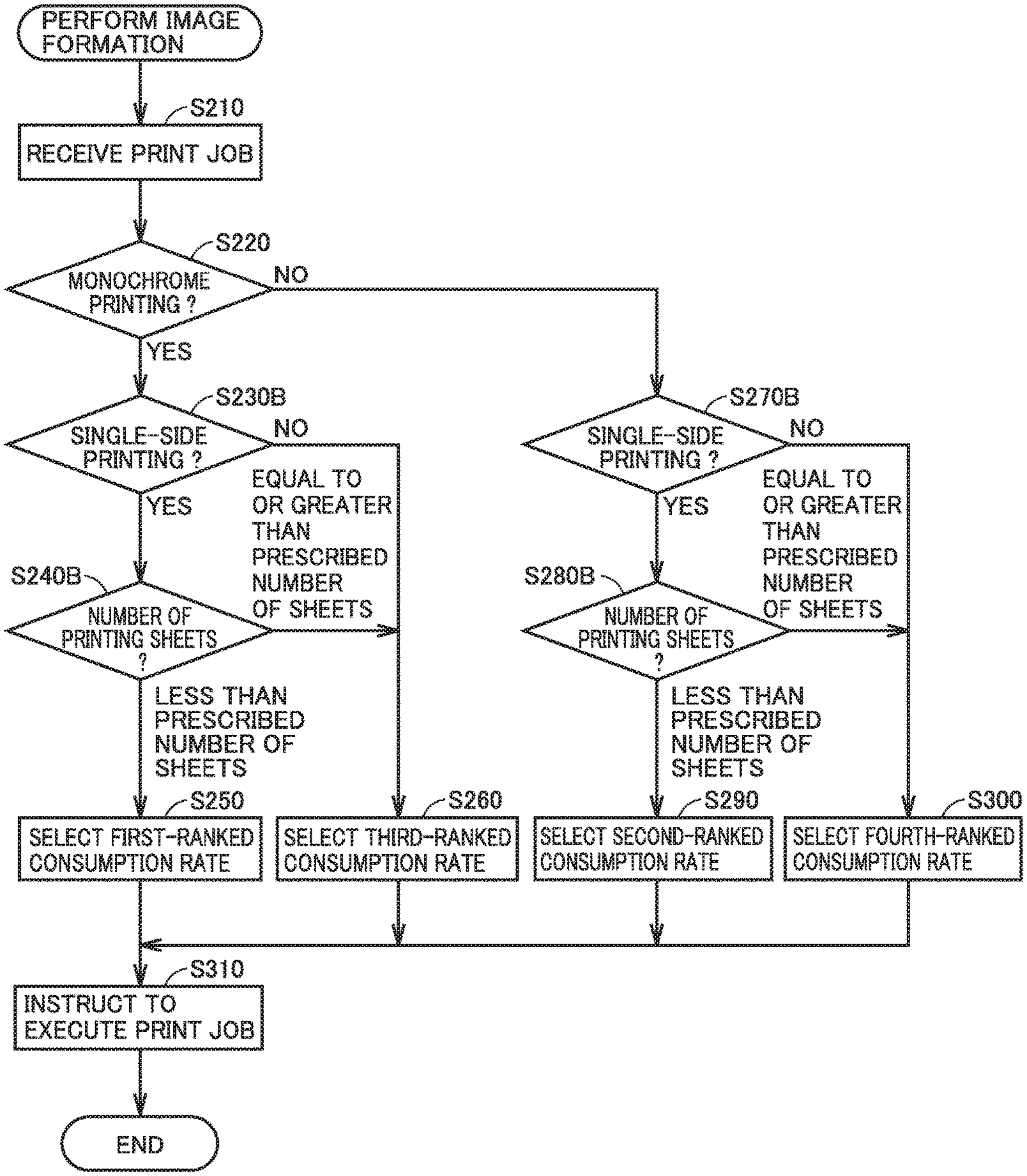

In the process in FIG. 19, three determinations are made regarding the print job. Specifically, in the process in FIG. 19, firstly, "monochrome printing/color printing" is determined in step S220; secondly, the number of printing sheets is determined in step S230 or step S270; and thirdly, "single-side printing/double-side printing" is determined in step S240 or step S280. The order of these three determinations may be changed. FIGS. 20 and 21 each are a flowchart showing a modification of the process in FIG. 19.

In the process in FIG. 20, firstly, "single-side printing/double-side printing" is determined in step S220A;

secondly, the number of printing sheets is determined in step S230 or step S270; and thirdly, "monochrome printing/color printing" is determined in step S240A or step S280A.

The determination in step S220A in FIG. 20 is, for example, the same as the determination in step S240 or step S280 in FIG. 19. The determination in each of step S240A and step S280A in FIG. 20 is, for example, the same as the determination in step S220 in FIG. 19.

In the process in FIG. 21, firstly, "monochrome printing/color printing" is determined in step S220; secondly, "single-side printing/double-side printing" is determined in step S230B or step S270B; and thirdly, the number of printing sheets is determined in step S240B or step S280B.

The determination in each of steps S230B and 270B in FIG. 21 is, for example, the same as the determination in step S240 or step S280 in FIG. 19. The determination in each of steps S240B and S280B in FIG. 21 is, for example, the same as the determination in each of steps S230 and S270 in FIG. 19.

In the network system shown in FIG. 17, CPU 310 of image forming apparatus 200A is provided as an example of an instruction unit configured to select one or more image forming apparatuses each instructing a print job from among the plurality of image forming apparatuses (image forming apparatuses 200A to 200D).

Figure 22:
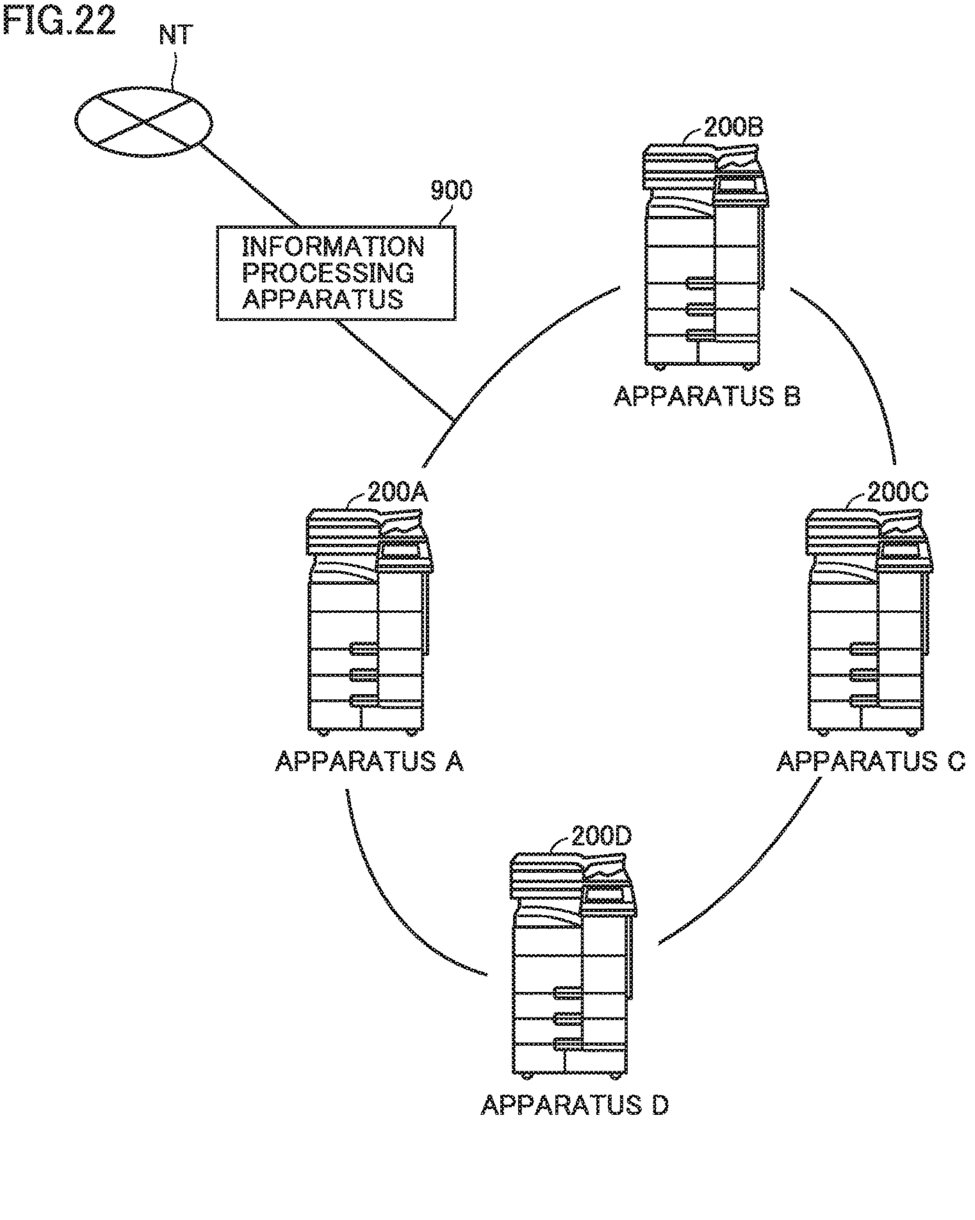
FIG. 22 is a diagram showing an example of a modification system of the network system shown in FIG. 17.

FIG. 22 is a diagram showing an example of a modification system of the network system shown in FIG. 17. The network system shown in FIG. 17 may also include an information processing apparatus 900 functioning as a printer server separately from image forming apparatus 200A, as shown in FIG. 22. Information processing apparatus 900 is an example of a computer executing a program. In the network system in FIG. 22, information processing apparatus 900 performs step S160 and step S170 in FIG. 18 and all steps in FIG. 19. In this case, the processor (for example, a CPU) included in information processing apparatus 900 and executing a program constitutes an example of an instruction unit configured to select one or more image forming apparatuses each instructing a print job, from among the plurality of image forming apparatuses (image forming apparatuses 200A to 200D).

In the network system shown in FIG. 17 or FIG. 22, the computer functioning as a printer server may calculate the consumption rate of secondary transfer roller 9 in each image forming apparatus in place of CPU 310 of each image forming apparatus.

[Summary of Disclosure]

(Configuration 1)

In the present disclosure, the consumption rate is an example of a value indicating the consumption degree of the conductive member. This value may be calculated in any manner other than the expression (1) as long as it indicates the consumption degree of the conductive member. CPU 310 of image forming apparatus 200 calculates this value at least using the operating ratio of secondary transfer roller 9 and the magnitude (Rmes) of the electrical resistance of secondary transfer roller 9.

(Configuration 2)

CPU 310 can access information (the first coefficient table) defining a coefficient (the first coefficient) associated with the operating ratio, and may specify the coefficient associated with the operating ratio of the secondary transfer roller, and may calculate the value indicating the consumption degree of the secondary transfer roller by using the specified coefficient.

(Configuration 3)

CPU 310 may calculate the value indicating the consumption degree by further using a temperature and humidity inside the image forming apparatus (the second coefficient, FIG. 7).

(Configuration 4)

CPU 310 may calculate the value indicating the consumption degree by further using an amount of change in a temperature from when the image forming apparatus is returned from a standby state or by further using an amount of change in the temperature from when power is turned on (the third coefficient, FIG. 8).

(Configuration 5)

CPU 310 may set an estimate value of the temperature (a "reference temperature" in FIG. 8) at the time when the image forming apparatus is returned from the standby state or when power is turned on, by using absolute humidity or an absolute moisture amount in air inside the image forming apparatus. CPU 310 may set the amount of change by using the estimate value and a measurement value of the temperature inside the image forming apparatus.

(Configuration 6)

Image forming apparatus 200 may include a temperature detection unit (temperature sensor 71) for detecting the temperature inside the image forming apparatus, and a humidity detection unit (humidity sensor 72) for detecting the humidity inside the image forming apparatus.

(Configuration 7)

When the value indicating the consumption degree exceeds a predetermined threshold value, CPU 310 does not have to cause the image forming unit to perform image formation. In this case, CPU 310 may give a notification that image formation is not performed (FIG. 16).

(Configuration 8)

When the value indicating the consumption degree exceeds a predetermined threshold value, CPU 310 may provide an output to a display for indicating that the value indicating the consumption degree exceeds the predetermined threshold value (FIG. 15).

(Configuration 9)

CPU 310 may set a constant (Rmax) used for acquiring the value indicating the consumption degree from a value of the electrical resistance of the conductive member.

When an increase amount of the electrical resistance of the conductive member from a prescribed point of time is equal to or less than a predetermined set value, CPU 310 may set the constant such that the value of the electrical resistance of the conductive member corresponds to the consumption degree that is lower than that when the increase amount exceeds the predetermined set value.

For example, when the increase amount is equal to or less than the set value, CPU 201 sets an upper limit value B as Rmax (step S100 in FIG. 14). When the above-described increase amount exceeds the set value, CPU 310 sets an upper limit value A as Rmax (step S90 in FIG. 14). Upper limit value B is greater than upper limit value A. When upper limit value B is set, the denominator in the first term of the expression (1) is greater than that when upper limit value A is set. Thereby, when upper limit value B is set, the value of the consumption rate calculated for the value of the same Rmes is smaller than that when upper limit value A is set.

(Configuration 10)

CPU 310 may rank the plurality of image forming apparatuses regarding the value indicating the consumption degree of each of the plurality of image forming apparatuses (steps S160 and S170 in FIG. 18).

When CPU 310 receives the print job, as a value of a bias voltage predicted to be applied to a conductive member in the print job is higher, CPU 310 may select an image forming apparatus with a lower value indicating the consumption degree from among the plurality of image forming apparatuses as an image forming apparatus caused to execute the print job (FIG. 19).

(Configuration 11)

When CPU 310 receives the print job, as the bias voltage predicted for a type of the print job (monochrome printing/color printing, single-side printing/double-side printing) is higher, CPU 310 may select an image forming apparatus with a lower value indicating the consumption degree from among the plurality of image forming apparatuses as an image forming apparatus caused to execute the print job.

(Configuration 12)

The type of the print job may specify whether an image formed in the print job is a monochrome image or a color image. A bias voltage predicted for a type for forming a color image may be set to be higher than a bias voltage predicted for a type for forming a monochrome image.

Thereby, when the type of the print job specifies a color image, an image forming apparatus with the consumption rate ranked lower than that in the case of a monochrome image (with a lower consumption degree of secondary transfer roller 9) is selected as an image forming apparatus executing the print job. In other words, in step S240A in FIG. 20, CPU 310 selects image forming apparatus 200 with the third-ranked consumption rate regarding the print job for a color image, and selects image forming apparatus 200 with the first-ranked consumption rate regarding the print job for a monochrome image. In step S280A in FIG. 20, CPU 310 selects image forming apparatus 200 with the fourth-ranked consumption rate regarding the print job for a color image, and selects image forming apparatus 200 with the second-ranked consumption rate regarding the print job for a monochrome image.

(Configuration 13)

The type of the print job may specify whether the print job causes an image to be formed on one side of a sheet of paper or an image to be formed on both sides of the sheet of paper. A bias voltage predicted for a type for forming an image on both sides of the sheet of paper may be set to be higher than a bias voltage predicted for a type for forming an image on one side of the sheet of paper.

Thereby, if the type of the print job specifies double-side printing, an image forming apparatus with the consumption rate ranked lower than that in the case of single-side printing is selected as an image forming apparatus executing the print job. Specifically, in step S240 in FIG. 19, CPU 310 selects image forming apparatus 200 with the third-ranked consumption rate regarding the print job for double-side printing, and selects image forming apparatus 200 with the first-ranked consumption rate regarding the print job for single-side printing. In step S280 in FIG. 19, CPU 310 selects image forming apparatus 200 with the fourth-ranked consumption rate regarding the print job for double-side printing, and selects image forming apparatus 200 with the second-ranked consumption rate regarding the print job for single-side printing.

(Configuration 14)

As the number of sheets of paper having an image formed thereon by the print job is greater, CPU 310 may select an image forming apparatus with a lower value indicating the consumption degree as an image forming apparatus caused to execute the print job. For example, in step S240B in FIG. 21, CPU 310 selects image forming apparatus 200 with the third-ranked consumption rate when the number of printing sheets through the print job is equal to or greater than a prescribed number of sheets, and selects image forming apparatus 200 with the first-ranked consumption rate when the number of printing sheets through the print job is less than the prescribed number of sheets. In step S280B in FIG. 21, CPU 310 selects image forming apparatus 200 with the fourth-ranked consumption rate when the number of printing sheets through the print job is equal to or greater than the prescribed number of sheets, and selects image forming apparatus 200 with the second-ranked consumption rate when the number of printing sheets through the print job is less than the prescribed number of sheets.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:

a conductive member to which a bias voltage is supplied in image formation;

a controller configured to control an operation of the image forming apparatus;

a voltmeter electrically connected to the conductive member and controller and configured to measure a value of a voltage applied to the conductive member; and an amperemeter connected to the conductive member and the controller and configured to measure a value of a current flowing through the conductive member, wherein the controller is configured to calculate an operating ratio indicating a percentage of a time period during which the conductive member is used, determine a magnitude of an electrical resistance of the conductive member on a basis of the voltage and current measured by the voltmeter and amperemeter, respectively, and calculate a value indicating a consumption degree of the conductive member based on the calculated operating ratio and the magnitude of the electrical resistance of the conductive member.

2. The image forming apparatus according to claim 1, wherein the controller is further configured to access information defining each of coefficients that is associated with a corresponding one of operating ratios, and calculate the value indicating the consumption degree by using a coefficient of the coefficients that is associated with the calculated operating ratio.

3. The image forming apparatus according to claim 1, wherein the controller calculates the value indicating the consumption degree by further using a temperature and humidity inside the image forming apparatus.

4. The image forming apparatus according to claim 3, wherein the controller calculates the value indicating the consumption degree by further using an amount of change in a temperature from when the image forming apparatus is returned from a standby state or by further using an amount of change in the temperature from when power is turned on.

5. The image forming apparatus according to claim 4, wherein the controller sets an estimate value of the temperature at a time when the image forming apparatus is returned from the standby state or when power is turned on, by using absolute humidity or an absolute moisture amount in air inside the image forming apparatus, and sets the amount of change in the temperature by using the estimate value and a measurement value of the temperature inside the image forming apparatus.

6. The image forming apparatus according to claim 3, further comprising:

a temperature sensor for detecting the temperature inside the image forming apparatus;

and a humidity sensor for detecting the humidity inside the image forming apparatus.

7. The image forming apparatus according to claim 1, wherein, when the value indicating the consumption degree exceeds a predetermined threshold value, the controller prevents the image forming apparatus from performing image formation.

8. The image forming apparatus according to claim 7, wherein the controller uses a constant for acquiring the value indicating the consumption degree from a value of the electrical resistance of the conductive member, and when an increase amount of the electrical resistance of the conductive member from a prescribed point of time is equal to or less than a predetermined set value, sets the constant such that the value of the electrical resistance of the conductive member corresponds to the consumption degree that is lower than that when the increase amount exceeds the predetermined set value.

9. The image forming apparatus according to claim 1, further comprising a display, wherein when the value indicating the consumption degree exceeds a predetermined threshold value, the controller provides an output to the display for indicating that the value indicating the consumption degree exceeds the predetermined threshold value.

10. An image forming system including a plurality of image forming apparatuses according to claim 1 that are connected so as to be capable of communicating with one another, the plurality of image forming apparatuses including one image forming apparatus that includes the controller, wherein the controller is further configured to communicate with each image forming apparatus of the plurality of image forming apparatuses to receive, from each image forming apparatus, a respective value indicating a consumption degree, rank the one image forming apparatus including the controller and other image forming apparatuses regarding the value indicating the consumption degree, and when receiving a print job, as a value of a bias voltage to be applied to a conductive member in the print job becomes high, select an image forming apparatus with a lower value indicating the consumption degree from among the one image forming apparatus including the controller and other image forming apparatuses as an image forming apparatus caused to execute the print job.

11. The image forming system according to claim 10, wherein when receiving the print job, as a bias voltage for a type of the print job becomes high, the controller selects an image forming apparatus with a lower value indicating the consumption degree from among the plurality of image forming apparatuses as an image forming apparatus caused to execute the print job.

12. The image forming system according to claim 11, wherein the type of the print job specifies whether an image formed in the print job is a monochrome image or a color image, and a bias voltage for a type for forming a color image is higher than a bias voltage for a type for forming a monochrome image.

13. The image forming system according to claim 11, wherein the type of the print job specifies whether the print job causes an image to be formed on one side of a sheet of paper or an image to be formed on both sides of the sheet of paper, and a bias voltage for a type for forming an image on both sides of the sheet of paper is higher than a bias voltage for a type for forming an image on one side of the sheet of paper.

14. The image forming system according to claim 10, wherein as the number of sheets of paper having an image formed thereon by the print job is greater, the controller selects an image forming apparatus with a lower value indicating the consumption degree as an image forming apparatus caused to execute the print job.

15. A non-transitory computer readable storage medium recording a program executed by a computer in an image forming apparatus including a conductive member to which a bias voltage is supplied in image formation, the program causing the computer to perform:

calculating an operating ratio indicating a percentage of a time period during which the conductive member is used;

determining a magnitude of an electrical resistance of the conductive member on a basis of a voltage measured by a voltmeter and a current measured by an amperemeter, and based on the operating ratio and the magnitude of the electrical resistance of the conductive member, calculating a value indicating a consumption degree of the conductive member.

16. The non-transitory computer readable storage medium according to claim 15, wherein the program causes the computer in the image forming apparatus to communicate with each image forming apparatus of a plurality of other image forming apparatuses to receive, from each image forming apparatus, a respective value indicating a consumption degree, and select one or more image forming apparatuses each caused to execute a print job from among the image forming apparatus including the computer and the plurality of other image forming apparatuses, wherein the selecting one or more image forming apparatuses includes ranking the image forming apparatus including the computer and the plurality of other image forming apparatuses regarding the value indicating the consumption degree; and when receiving the print job, as a value of the bias voltage to be applied to the conductive member in the print job becomes high, selecting an image forming apparatus with a lower value indicating the consumption degree from among the plurality of image forming apparatuses as an image forming apparatus caused to execute the print job.

17. An image forming system comprising:

a plurality of image forming apparatuses; and an information processing apparatus configured to communicate with the plurality of image forming apparatuses, each of the plurality of image forming apparatuses including a controller, and a conductive member to which a bias voltage is supplied in image formation, the controller configured to calculate an operating ratio indicating a percentage of a time period during which the conductive member is used, and based on the operating ratio and a magnitude of an electrical resistance of the conductive member, calculate a value indicating a consumption degree of the conductive member, wherein the information processing apparatus receives, from each image forming apparatus of the plurality of image forming apparatuses, a respective value indicating the consumption degree, and wherein the information processing apparatus includes an interface configured to accept selection of one or more image forming apparatuses each caused to execute a print job from among the plurality of image forming apparatuses, and as a value of the bias voltage to be applied to a conductive member of a selected image forming apparatus in the print job becomes high, the information processing apparatus is configured to select an image forming apparatus with a lower value indicating the consumption degree from among the plurality of image forming apparatuses as an image forming apparatus caused to execute the print job.

* * * * *